United States Patent
Haga et al.

(10) Patent No.: US 9,697,574 B2
(45) Date of Patent: Jul. 4, 2017

(54) DATA PROCESSING METHOD, TRANSMITTING APPARATUS, AND ANOMALY DETECTION SYSTEM

(71) Applicant: Panasonic Corporation, Osaka (JP)

(72) Inventors: Tomoyuki Haga, Nara (JP); Natsume Matsuzaki, Osaka (JP); Yuichi Futa, Ishikawa (JP); Hideki Matsushima, Osaka (JP); Manabu Maeda, Osaka (JP); Yuji Unagami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 556 days.

(21) Appl. No.: 14/353,345

(22) PCT Filed: Aug. 19, 2013

(86) PCT No.: PCT/JP2013/004892
§ 371 (c)(1),
(2) Date: Apr. 22, 2014

(87) PCT Pub. No.: WO2014/038145
PCT Pub. Date: Mar. 13, 2014

(65) Prior Publication Data
US 2014/0277798 A1    Sep. 18, 2014

(30) Foreign Application Priority Data
Sep. 5, 2012 (JP) .................................. 2012-195018

(51) Int. Cl.
*H04Q 9/00* (2006.01)
*G06Q 50/06* (2012.01)
*G08B 21/04* (2006.01)

(52) U.S. Cl.
CPC ......... *G06Q 50/06* (2013.01); *G08B 21/0484* (2013.01); *H04Q 9/00* (2013.01); *H04Q 2209/60* (2013.01)

(58) Field of Classification Search
None
See application file for complete search history.

(56) References Cited

U.S. PATENT DOCUMENTS 6,263,055 B1 * 7/2001 Garland ................. H04M 11/02
                                                      379/102.01
7,343,267 B1 * 3/2008 Casler .................... G06Q 10/10
                                                      702/189

(Continued)

FOREIGN PATENT DOCUMENTS

JP    2003-141666    5/2003
JP    2005-346291    12/2005

(Continued)

OTHER PUBLICATIONS

International Search Report issued Nov. 19, 2013 in corresponding International Application No. PCT/JP2013/004892.

*Primary Examiner* — Isaac T Tecklu
(74) *Attorney, Agent, or Firm* — Wenderoth, Lind & Ponack, L.L.P.

(57) ABSTRACT

A data processing method for processing usage history data of at least one electrical device used by a user, including: obtaining first usage history data indicating a usage history of at least one electrical device used by the user; obtaining second usage history data indicating a fixed dummy usage history; generating third usage history data by combining the first usage history data and the second usage history data; and transmitting the third usage history data from a first apparatus to a second apparatus.

22 Claims, 21 Drawing Sheets

(56) References Cited

U.S. PATENT DOCUMENTS

| | | | | |
|---|---|---|---|---|
| 2004/0024483 | A1* | 2/2004 | Holcombe | G06Q 30/02 700/122 |
| 2008/0070652 | A1* | 3/2008 | Nguyen | G06F 1/3203 463/1 |
| 2010/0001870 | A1* | 1/2010 | Hong | G01R 31/3606 340/636.1 |
| 2010/0191487 | A1* | 7/2010 | Rada | G05F 1/70 702/60 |
| 2010/0313270 | A1* | 12/2010 | Kim | G06F 1/28 726/24 |
| 2011/0184586 | A1* | 7/2011 | Asano | G05B 15/02 700/297 |
| 2011/0231000 | A1* | 9/2011 | Higashi | H05K 13/08 700/105 |
| 2011/0251807 | A1* | 10/2011 | Rada | G01D 4/00 702/61 |
| 2012/0166151 | A1* | 6/2012 | Fisera | F25B 49/005 703/2 |
| 2012/0192003 | A1* | 7/2012 | Akiyama | G01D 1/00 713/340 |
| 2012/0286723 | A1* | 11/2012 | Ukita | G06Q 10/06312 320/107 |
| 2013/0204552 | A1* | 8/2013 | Lin | G01R 31/2846 702/58 |
| 2015/0237215 | A1* | 8/2015 | Leemet | H04W 4/26 455/405 |

FOREIGN PATENT DOCUMENTS

| | | |
|---|---|---|
| JP | 2007-183890 | 7/2007 |
| JP | 2007-199002 | 8/2007 |
| JP | 2008-112267 | 5/2008 |
| JP | 2011-155322 | 8/2011 |
| JP | 2011-155713 | 8/2011 |
| JP | 2012-196059 | 10/2012 |
| WO | 2011/089854 | 7/2011 |

* cited by examiner (a)

(b)

ial device.

DATA PROCESSING METHOD, TRANSMITTING APPARATUS, AND ANOMALY DETECTION SYSTEM

TECHNICAL FIELD

The present invention relates to a technique for processing data on a usage history of an electrical device.

BACKGROUND ART

A conventional technique has been proposed in which a usage history of an electrical device is monitored to detect an anomaly in a living pattern of a user (see Patent Literature (PTL) 1, for example). In the technique of PTL 1, a server device receives daily power consumption as a usage history of an electrical device from a client terminal. The server device then compares the received daily power consumption and pattern data obtained by modeling daily power consumption of the user to detect an anomaly in the living pattern of the user.

CITATION LIST

Patent Literature

[PTL 1] Japanese Unexamined Patent Application Publication No. 2007-183890
[PTL 2] Japanese Unexamined Patent Application Publication No. 2011-155713

SUMMARY OF INVENTION

Technical Problem

In the above conventional technique, however, usage history data of a device is transmitted from the client terminal to the server device, which may lead to leakage of the usage history of the device, which requires privacy protection.

The present invention therefore provides a data processing method which can improve safety against leakage of a usage history of an electrical device in the case of transmitting data on the usage history of the electrical device.

Solution to Problem

A data processing method according to an aspect of the present invention is a data processing method for processing usage history data of at least one electrical device used by a user, and includes: obtaining first usage history data indicating a usage history of the at least one electrical device used by the user; obtaining second usage history data indicating a fixed dummy usage history; generating third usage history data by combining the first usage history data and the second usage history data; and transmitting the third usage history data from a first apparatus to a second apparatus.

It is to be noted that these general and specific aspects may be implemented using a system, an apparatus, an integrated circuit, a computer program, or a recording medium such as a compact disc read-only memory (CD-ROM), or any combination of systems, apparatuses, integrated circuits, computer programs, and recording media such as CD-ROM.

Advantageous Effects of Invention

In the data processing method according to an aspect of the present invention, it is possible to improve the safety against leakage of a usage history of an electrical device in the case of transmitting data on the usage history of the electrical device.

Figure 1:
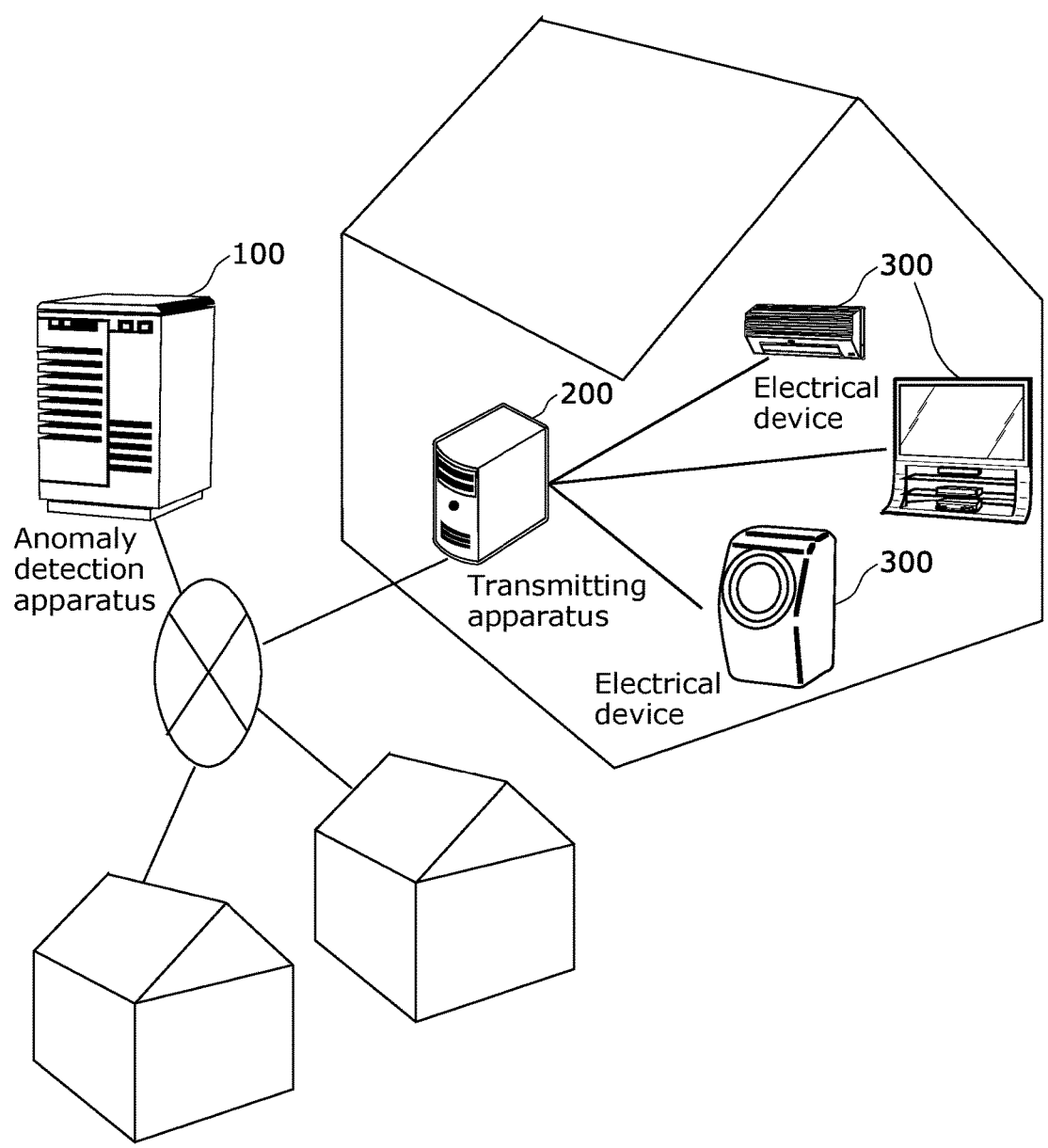
FIG. 1 illustrates an overall picture of an anomaly detection system in Embodiment 1.

DESCRIPTION OF EMBODIMENTS (Underlying Knowledge Forming Basis of the Present Invention)

For example, in the case where data on a usage history of an electrical device is transmitted to a server device, there is a possibility that the usage history leaks in a communication path or the server device. When the usage history thus leaks, a third person who obtains the usage history can know a living pattern of a user from the usage history. For example, if the electrical device is not used for a long time, the third person can know that the user is not present inside the building.

It is therefore conceivable that the usage history of the electrical device is camouflaged before being transmitted to the server device in order to prevent the usage history from leaking. For example, in the technique disclosed by PTL 2, power consumption is controlled so that the power consumption will always have the same pattern in order to protect privacy.

However, in the case where the power consumption will always have the same pattern, the pattern of power consumption cannot be used to detect an anomaly in a living pattern of a user, for example.

Thus, a data processing method according to an aspect of the present invention is a data processing method for processing usage history data of at least one electrical device used by a user, and includes: obtaining first usage history data indicating a usage history of the at least one electrical device used by the user; obtaining second usage history data indicating a fixed dummy usage history; generating third usage history data by combining the first usage history data and the second usage history data; and transmitting the third usage history data from a first apparatus to a second apparatus.

By doing so, the third usage history data generated by combining the first usage history data and the second usage history data is transmitted from the first apparatus to the second apparatus. Therefore, even if the third usage history data is wrongly intercepted in the communication path between the first apparatus and the second apparatus, it is possible to reduce the occurrence of fraudulent procurement of the first usage history data since the third usage history data includes the combined second usage history data. In other words, the safety against leakage of the usage history of the electrical device can be improved.

For example, it may be that the first usage history data includes a usage value for each of cyclic time sections, the usage value indicating a usage level of the electrical device, the second usage history data includes a fixed dummy value for each of the cyclic time sections, and in the generating, the usage value and the dummy value are summed on a per time section basis to generate the third usage history data.

By doing so, the second usage history data can include a fixed dummy value for each of cyclic time sections. Therefore, as compared to the case where the second usage history data includes a fixed dummy value regardless of a time section, it can be less likely that the first usage history data will be identified from the third usage history data.

For example, the data processing method may further include transmitting a control instruction to the electrical device when the usage value included in the first usage history data is less than a threshold value, the control instruction being for increasing the usage value.

By doing so, when the usage value included in the first usage history data is smaller than the threshold value, the control instruction for increasing the usage value can be transmitted to the electrical device. Therefore, the third usage history data can be less likely to match the second usage history data, with the result that the occurrence of the second usage history data being estimated from the third usage history data can be reduced. This means that the first usage history data can be less likely to be identified from the third usage history data.

For example, in the transmitting of a control instruction, when the usage value is less than the threshold value, an instruction to charge a storage battery included in the electrical device may be transmitted to the electrical device as the control instruction for increasing the usage value.

By doing so, the instruction to charge the storage battery can be transmitted to the electrical device as the control instruction for increasing the usage value. Therefore, it is possible to reduce unnecessary power consumption.

For example, the usage value may indicate an amount of power consumed by the electrical device.

By doing so, a history of power consumption of the electrical device can be used as the usage history.

For example, the usage value may indicate a total number of usages of a function of the electrical device.

By doing so, a history of the number of usages of a function of the electrical device can be used as the usage history.

For example, it may be that the data processing method further includes: setting cycle information; and transmitting the set cycle information from the first apparatus to the second apparatus, and in the obtaining of second usage history data, the second usage history data that corresponds to the set cycle information is obtained from among a plurality of second usage history data.

By doing so, the cycle information is set in the first apparatus, and the set cycle information is transmitted to the second apparatus. Thus, the first apparatus and the second apparatus can share the cycle information, with the result that the cycle in the usage history data can be changed. This means that it is possible to set appropriate cycle information according to the use status of the electrical device and so on. As a result, the safety against leakage of the usage history of the electrical device can be improved.

For example, it may be that the data processing method further includes displaying a first graphical user interface for specifying the cycle information, and in the setting, the cycle information specified by the user through the first graphical user interface is set.

By doing so, it is possible to set the cycle information specified by the user through the first graphical user interface, so that the convenience of the user can be improved.

For example, the data processing method may further include displaying, before the cycle information is set, the first usage history data and the third usage history data that are to be obtained after the cycle information is set.

By doing so, the first usage history data and the third usage history data which will be obtained after the cycle information is set can be displayed before the cycle information is set. Therefore, the user can check in advance whether or not the cycle information improves the safety against leakage of the usage history.

For example, it may be that the first usage history data includes a function of the electrical device and a usage time point of the function, the second usage history data includes a function of the electrical device and a fixed dummy usage time point of the function, and in the generating, the second usage history data is added to the first usage history data to generate the third usage history data.

By doing so, a function of the electrical device and a usage time point of the function can be used as the usage history data.

For example, the data processing method may further include detecting an anomaly in a living pattern of the user by the second apparatus comparing the third usage history data received from the first apparatus and a usage history pattern for detecting an anomaly.

Here, the second usage history data is a fixed dummy usage history. Therefore, when a temporal change occurs in the first usage history data, a temporal change also occurs in the third usage history data. Accordingly, it is possible to detect an anomaly in the living pattern of the user by comparing the third usage history data and the usage history pattern. This means that there is no need to use the first usage history data in order to detect an anomaly in the living pattern of the user, with the result that the safety against leakage of the first usage history data can be improved.

For example, the data processing method may further include performing, when the anomaly in the living pattern of the user is detected, processing appropriate for the anomaly detected.

By doing so, when an anomaly in the living pattern of the user is detected, processing appropriate for the anomaly can be performed.

For example, the processing appropriate for the anomaly may be notifying a pre-registered terminal that the living pattern of the user contains the anomaly.

With this, when an anomaly in the living pattern of the user is detected, a pre-registered terminal can be notified that the living pattern of the user contains the anomaly.

For example, the processing appropriate for the anomaly may be switching a mode of a service provided to the user to an anomaly mode.

With this, when an anomaly in the living pattern of the user is detected, the mode of a service provided to the user can be switched to a mode for abnormal circumstances. Accordingly, when a situation of having a visitor is detected while a service to distribute advertisements selected for the user is provided, a switch to a mode for distributing advertisements unrelated to the privacy of the user is possible, for example. As a result, preferences of the user can be prevented from being exposed to the visitor.

For example, it may be that the first usage history data includes a usage value for each of cyclic time sections, the usage value indicating a usage level of the electrical device, the second usage history data includes a fixed dummy value for each of the cyclic time sections, the usage history pattern includes a reference value for each of the cyclic time sections, in the generating, the usage value and the dummy value are summed on a per time section basis to generate the third usage history data, and in the detecting, a summed value of the usage value and the dummy value included in the third usage history data and the reference value included in the usage history pattern are compared for each time section, to detect an anomaly in the living pattern of the user in the time section.

By doing so, the second usage history data can include a fixed dummy value for each of the cyclic time sections. Therefore, as compared to the case where the second usage history data includes a fixed dummy value regardless of a time section, it can be less likely that the first usage history data will be identified from the third usage history data.

For example, it may be that the data processing method further includes: setting cycle information; and transmitting the set cycle information from the first apparatus to the second apparatus, and in the obtaining of second usage history data, the second usage history data that corresponds to the set cycle information is obtained from among a plurality of second usage history data, and in the detecting, the anomaly in the living pattern of the user is detected using the usage history pattern that corresponds to a cycle indicated in the cycle information received from the first apparatus.

By doing so, the cycle information is set in the first apparatus, and the set cycle information is transmitted to the second apparatus. Thus, the first apparatus and the second apparatus can share the cycle information, with the result that it is possible to detect an anomaly in the living pattern of the user even when the cycle has been changed in the usage history data. This means that it is possible to set appropriate cycle information according to the use status of the electrical device and so on. As a result, it is possible to improve the accuracy of detecting an anomaly in the living pattern of the user or improve the safety against leakage of the usage history of the electrical device.

For example, it may be that the data processing method includes storing cycle information by the second apparatus into a storage unit, the cycle information being received from each of a plurality of the first apparatuses and stored in association with the first apparatus from which the cycle information originates, and in the detecting, the cycle information that corresponds to the first apparatus from which the third usage history data originates is obtained from the storage unit, and the anomaly in the living pattern of the user is detected using the usage history pattern that corresponds to a cycle indicated in the obtained cycle information.

By doing so, the cycle information can be stored into the storage unit in association with the first apparatus from which the cycle information originates. Therefore, different cycle information can be used for each first apparatus, with the result that the accuracy of detecting an anomaly in the living pattern of the user can be improved.

For example, the data processing method may further include: storing, by the second apparatus, the third usage history data received from the first apparatus, into a storage unit; transmitting, by the first apparatus, a request message for the third usage history data stored in the storage unit, to the second apparatus; transmitting, by the second apparatus, the third usage history data stored in the storage unit, to the first apparatus, according to the request message received from the first apparatus; restoring, by the first apparatus, the first usage history data from the third usage history data received from the second apparatus, using the second usage history data; and displaying, by the first apparatus, the restored first usage history data.

By doing so, in the first apparatus, it is possible to restore the first usage history data from the third usage history data received from the second apparatus. Therefore, even when past first usage history data is not held in the first apparatus, for example, the first apparatus is capable of displaying the first usage history data using the third usage history data received from the second apparatus.

For example, it may be that the data processing method further includes displaying a second graphical user interface for specifying information related to the first usage history data that is to be restored, and the request message includes information specified by the user through the second graphical user interface, and in the transmitting of the third usage history data stored in the storage unit, the second apparatus transmits, to the first apparatus, the third usage history data that corresponds to the information included in the request message.

By doing so, it is possible to display the first usage history data which corresponds to the information specified by the user through the second graphical user interface. Therefore, the usage history in a period or of an electrical device, desired by the user, can be displayed, for example, with the result that the convenience of the user can be improved.

It is to be noted that these general and specific aspects may be implemented using a system, an apparatus, an integrated circuit, a computer program, or a recording medium such as CD-ROM, or any combination of systems, apparatuses, integrated circuits, computer programs, and recording media such as CD-ROM.

The following shall specifically describe embodiments with reference to the Drawings.

It is to be noted that each of the embodiments described below shows a general or specific example. The numerical values, shapes, materials, structural elements, the arrangement and connection of the structural elements, steps, the processing order of the steps etc., shown in the following embodiments are mere examples, and therefore do not limit the scope of the Claims. Therefore, among the structural elements in the following embodiments, structural elements not recited in the independent claims defining the broadest concept are described as arbitrary structural elements.

(Embodiment 1)

Firstly, Embodiment 1 is specifically described with reference to FIG. 1 to FIG. 6.

<Structure of Anomaly Detection System 10>

Figure 2:
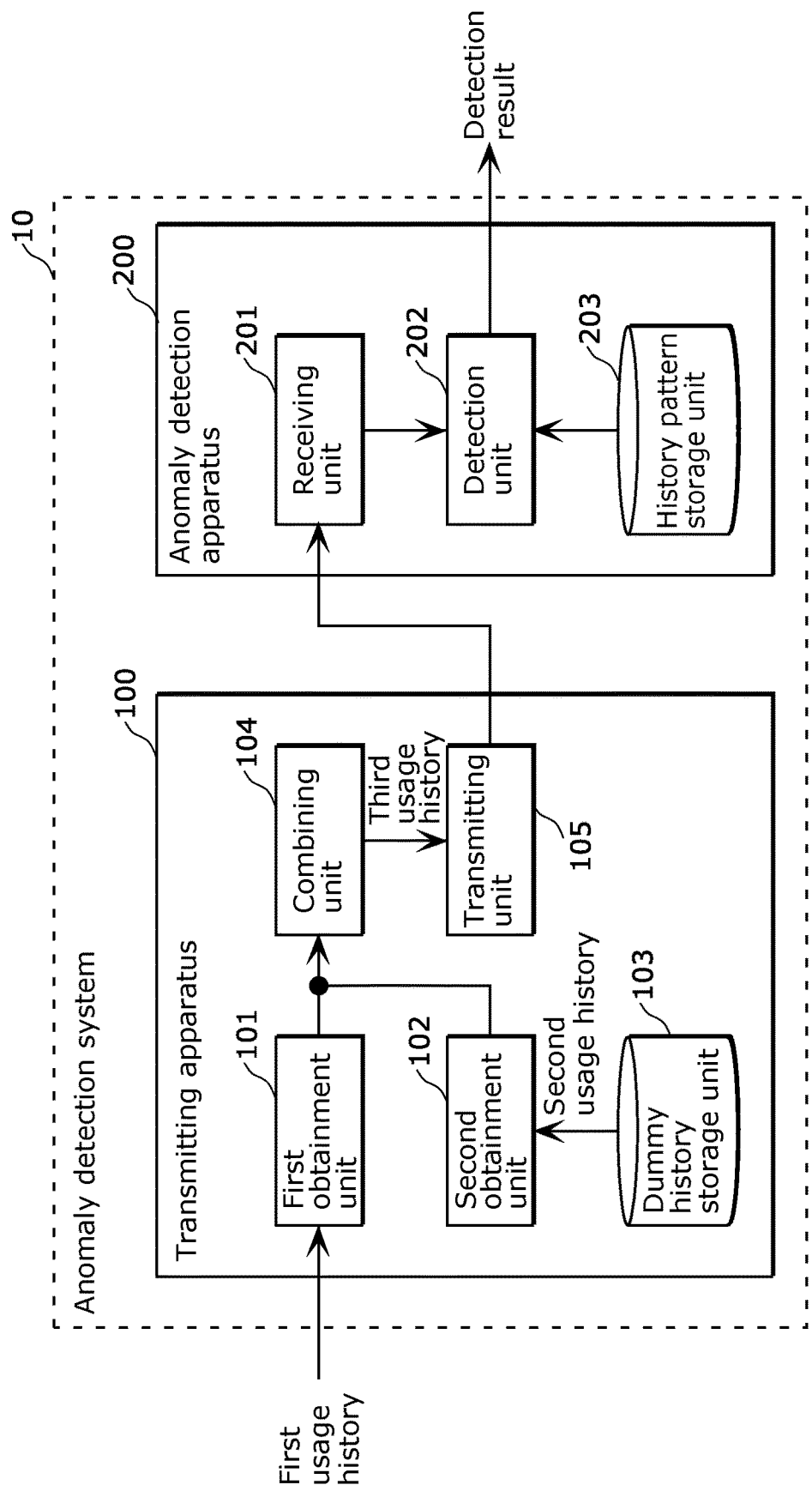
FIG. 2 is a block diagram illustrating a functional structure of the anomaly detection system in Embodiment 1.

FIG. 1 illustrates an overall picture of an anomaly detection system 10 in Embodiment 1. FIG. 2 is a block diagram illustrating a functional structure of the anomaly detection system 10 in Embodiment 1.

The anomaly detection system 10 detects an anomaly in a living pattern of a user based on a usage history of at least one electrical device 300 which is used by the user. As illustrated in FIG. 1 and FIG. 2, the anomaly detection system 10 includes a transmitting apparatus 100 and an anomaly detection apparatus 200. The transmitting apparatus 100 is an example of the first apparatus, and the anomaly detection apparatus 200 is an example of the second apparatus. The transmitting apparatus 100 and the anomaly detection apparatus 200 are connected through a communication network such as the Internet, for example.

Here, an anomaly in the living pattern of the user indicates that the living pattern of the user is not a normal state. In other words, an anomaly in the living pattern of the user indicates that the living pattern of the user is a different state from an ordinary state thereof. Specifically, an anomaly in the living pattern of the user includes a situation in which a third party different from a resident of a building (the user) is present as an intruder in the building, for example. Furthermore, an anomaly in the living pattern of the user may include a situation of having a visitor, for example. Moreover, an anomaly in the living pattern of the user may include cases where something abnormal happens to the user, such as the case where the user collapsed, resulting in being incapable of moving, for example.

<Structure of Transmitting Apparatus 100>

The transmitting apparatus 100 includes a first obtainment unit 101, a second obtainment unit 102, a dummy history storage unit 103, a combining unit 104, and a transmitting unit 105. The following describes each structural element included in the transmitting apparatus 100.

<First Obtainment Unit 101>

The first obtainment unit 101 obtains first usage history data indicating a usage history of at least one electrical device 300 (hereinafter referred to simply as "first usage history"). For example, the first obtainment unit 101 obtains, from the electrical device 300, the first usage history of that electrical device 300.

Here, the electrical device 300 is a device which generates electricity or a device which operates on electricity. Specifically, the electrical device 300 is a home appliance (e.g., a television, an air conditioner, a laundry machine, or a refrigerator), an office appliance (e.g., a printer or a facsimile machine), or the like.

The usage history is information indicating a use status of the electrical device 300 in time series. The use status of the electrical device 300 means a function used in the electrical device 300 or power consumed by the electrical device 300, for example.

Specifically, the first usage history includes a usage value of the electrical device 300 for each of cyclic time sections, for example.

Here, the cyclic time sections are each a unit of counting usage values. In the case where the cycle is one day and the time sections have a fixed length of one hour, the cyclic time sections are from 0 a.m. to 1 a.m., from 1 a.m. to 2 a.m., from 2 a.m. to 3 a.m., . . . , for example. In the case where the cycle is one week and the time sections have a fixed length of two hours, the cyclic time sections are from 0 a.m. to 2 a.m. on Monday, from 2 a.m. to 4 a.m. on Monday, . . . , from 0 a.m. to 2 a.m. on Wednesday, . . . , for example. In the case where the cycle is one month and the time sections have a fixed length of 12 hours, the cyclic time sections are the morning on the $1^{st}$, the afternoon on the $1^{st}$, the morning on the $2^{nd}$, . . . , the morning on the $15^{th}$, . . . , for example. It is to be noted that the cycle and the time sections are not limited to the above example.

The usage value indicates a usage level of the electrical device 300. Specifically, the usage value indicates an amount of power consumed by the electrical device 300, for example. For example, the usage value may indicate the number of usages of a function of the electrical device 300 (e.g., the number of times a door of a refrigerator has been opened or closed, the number of times a television has been powered on).

<Second Obtainment Unit 102>

The second obtainment unit 102 obtains second usage history data indicating a fixed dummy usage history (hereinafter referred to simply as "second usage history") from the dummy history storage unit 103. In other words, the second obtainment unit 102 obtains the fixed second usage history which does not depend on the first usage history (an actual usage history of the electrical device 300).

Specifically, the second usage history includes a fixed dummy value for each of the cyclic time sections, for example. In this case, the second obtainment unit 102 obtains, from the dummy history storage unit 103, a dummy value the cycle of which corresponds to that of the usage value included in the first usage history, for example. For example, when the first usage history includes a usage value for a time section T (e.g., "from 1 a.m. to 2 a.m."), the second obtainment unit 102 obtains a dummy value for the time section T (e.g., "from 1 a.m. to 2 a.m.") from the dummy history storage unit 103.

When the second usage history includes a fixed dummy value for each of the cyclic time sections as above, it can be less likely that the first usage history data will be identified from the third usage history as compared to the case where the second usage history includes a fixed dummy value regardless of the time section.

<Dummy History Storage Unit 103>

The dummy history storage unit 103 is a nonvolatile storage device such as a hard disk drive (HDD) or a semiconductor memory, for example. The dummy history storage unit 103 holds a fixed dummy usage history. Specifically, the dummy history storage unit 103 holds dummy values which correspond to the respective time sections and are for a period which corresponds to the cycle, for example.

In the case where the cycle of time sections is one day, the dummy history storage unit 103 holds a dummy usage history for one day (for 24 hours), for example. In this case, use of the same dummy value is repeated on a day-to-day basis. In the case where the cycle of time sections is one week, the dummy history storage unit 103 holds a dummy usage history for one week, for example. In this case, use of the same dummy value is repeated on a weekly basis. In the case where the cycle of time sections is one month, the dummy history storage unit 103 holds a dummy usage history for one month, for example. In this case, use of the same dummy value is repeated on a monthly basis.

<Combining Unit 104>

The combining unit 104 generates third usage history data (hereinafter referred to simply as "third usage history") by combining the first usage history obtained by the first obtainment unit 101 and the second usage history obtained by the second obtainment unit 102. In other words, the combining unit 104 combines the first usage history and the second usage history to generate the third usage history from which the first usage history and the second usage history cannot be individually identified.

Specifically, the combining unit 104 generates the third usage history by summing a usage value included in the first usage history and a dummy value included in the second usage history on a per time section basis, for example. At this time, the dummy value may be either a positive or negative value. Alternatively, the combining unit 104 may generate the third usage history by multiplying a usage value included in the first usage history and a dummy value included in the second usage history for each time section, for example.

<Transmitting Unit 105>

The transmitting unit 105 transmits, to the anomaly detection apparatus 200, the third usage history generated by the combining unit 104. For example, the transmitting unit 105 transmits the third usage history to the anomaly detection apparatus 200 through the communication network.

<Structure of Anomaly Detection Apparatus 200>

The anomaly detection apparatus 200 detects an anomaly in the living pattern of the user based on the third usage history received from the transmitting apparatus 100. The anomaly detection apparatus 200 includes a receiving unit 201, a detection unit 202, and a history pattern storage unit 203. The following describes each structural element included in the anomaly detection apparatus 200.

<Receiving Unit 201>

The receiving unit 201 receives the third usage history from the transmitting apparatus 100.

<Detection Unit 202>

The detection unit 202 compares the third usage history received from the transmitting apparatus 100 and a usage history pattern for detecting an anomaly, to detect an anomaly in the living pattern of the user. Specifically, the detection unit 202 compares, for each time section, a sum of the usage value and the dummy value included in the third usage history and a reference value included in the usage history pattern, for example, to detect an anomaly in the living pattern of the user.

More specifically, the detection unit 202 calculates a difference value between the sum included in the third usage history and the reference value included in the usage history pattern, for example. When the difference value is greater than a threshold value, the detection unit 202 then determines that the living pattern of the user contains an anomaly. Here, the detection unit 202 may calculate a ratio of the sum to the reference value instead of the difference value.

<History Pattern Storage Unit 203>

The history pattern storage unit 203 is a nonvolatile storage device such as a HDD or a semiconductor memory, for example. The history pattern storage unit 203 holds the usage history pattern for detecting an anomaly. This usage history pattern is obtained by combining a standard usage history of the electrical device 300 with the dummy usage history, for example.

Specifically, the usage history pattern includes a reference value for each of the cyclic time sections, for example. The reference value is a value for distinguishing abnormal from normal states in the living pattern of the user. For example, the reference value is a statistically representative value (e.g., the mean, median, or mode value) of the sum included in the third usage history. This reference value may be updated using the third usage history every time the third usage history is received.

It is to be noted that cycle information of the time section (hereinafter also referred to simply as "cycle") is shared by the transmitting apparatus 100 and the anomaly detection apparatus 200. Thus, the cycle of time sections in the dummy usage history which is used in the transmitting apparatus 100 and the cycle of time sections in the usage history pattern which is used in the anomaly detection apparatus 200 are the same.

Accordingly, in the case where the cycle of time sections is one day, for example, the history pattern storage unit 203 holds the usage history pattern for one day. In the case where the cycle of time sections is one week, for example, the history pattern storage unit 203 holds the usage history pattern for one week.

<Processing Operation of Anomaly Detection System 10>

Next, each operation in the anomaly detection system 10 structured as above is specifically described with reference to the Drawings.

<Processing Operation of Transmitting Apparatus 100>

Figure 3:
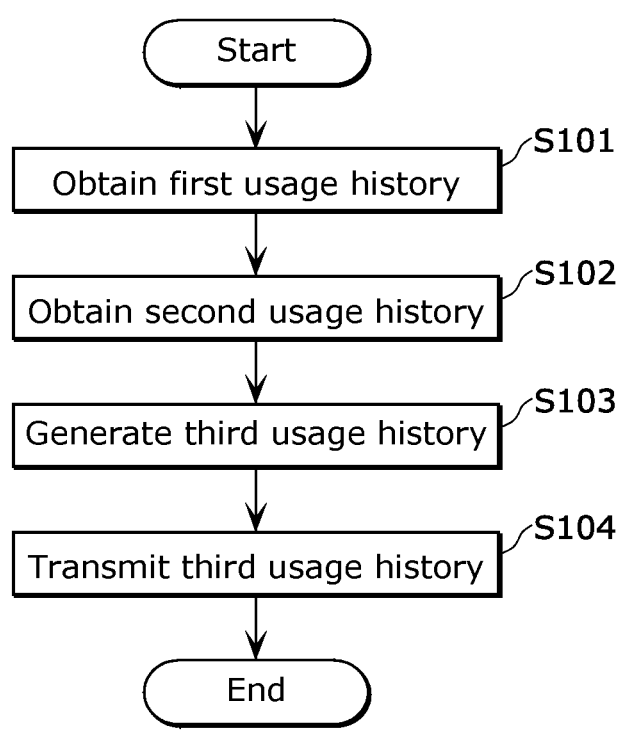
FIG. 3 is a flowchart illustrating a processing operation of a transmitting apparatus in Embodiment 1.
Figure 4:
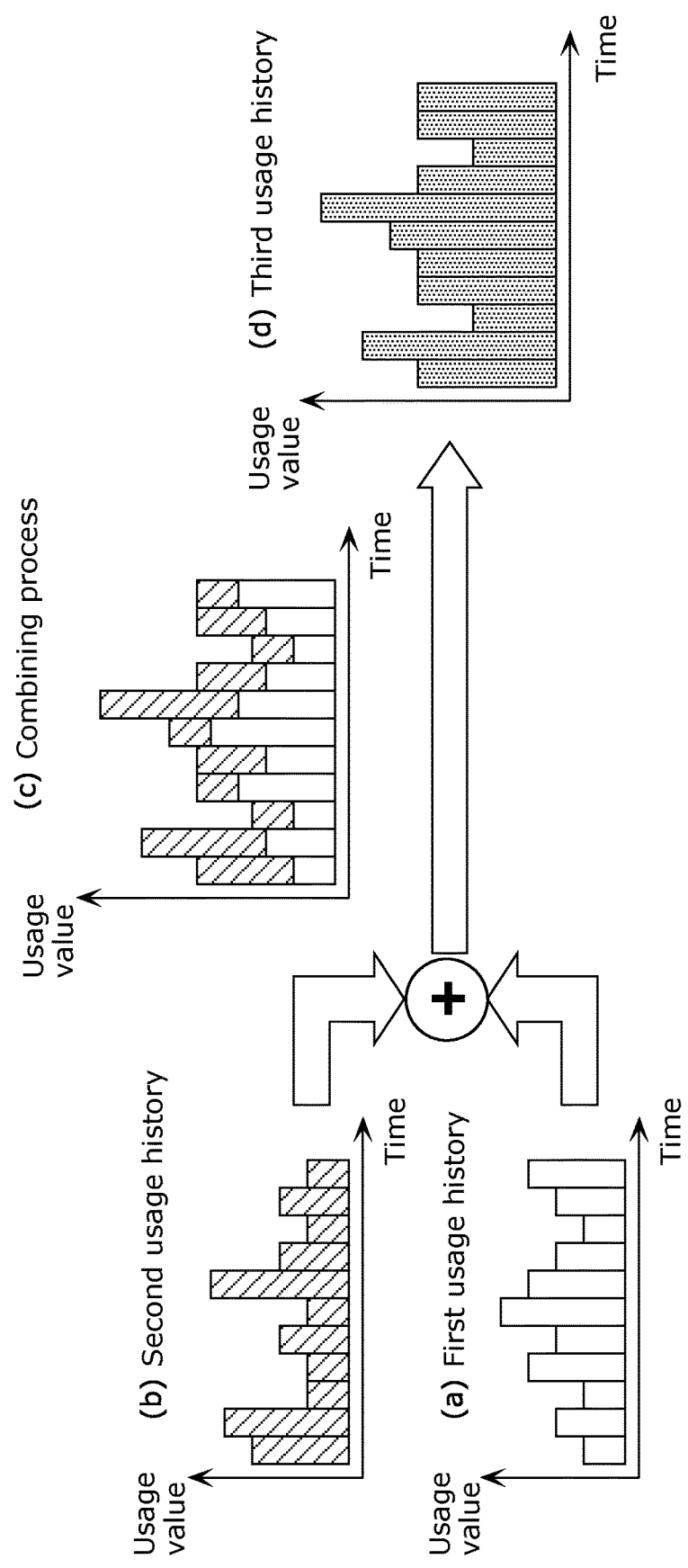
FIG. 4 is a view for explaining the processing operation of the transmitting apparatus in Embodiment 1.

Firstly, a processing operation of the transmitting apparatus 100 is specifically described with reference to FIG. 3 and FIG. 4. FIG. 3 is a flowchart illustrating a processing operation of the transmitting apparatus 100 in Embodiment 1. FIG. 4 is a view for explaining the processing operation of the transmitting apparatus 100 in Embodiment 1.

Firstly, the first obtainment unit 101 obtains the usage history of the electrical device 300 as the first usage history (S101). Specifically, the first obtainment unit 101 obtains the first usage history illustrated in (a) of FIG. 4, for example.

Subsequently, the second obtainment unit 102 obtains the fixed dummy usage history as the second usage history (S102). Specifically, the second obtainment unit 102 obtains the second usage history illustrated in (b) of FIG. 4, for example.

The combining unit 104 generates the third usage history by combining the first usage history and the second usage history (S103). Specifically, the combining unit 104 sums, for each of the cyclic time sections, the usage value included in the first usage history and the dummy value included in the second usage history as illustrated in (c) of FIG. 4, for example. As a result, the third usage history from which the first usage history and the second usage history cannot be identified is generated as illustrated in (d) of FIG. 4.

At the end, the transmitting unit 105 transmits the third usage history to the anomaly detection apparatus 200 (S104).

Thus, the transmitting apparatus 100 generates the third usage history and transmits the generated third usage history to the anomaly detection apparatus 200. It is to be noted that the processing illustrated in FIG. 3 only needs to be performed for each time section which is a unit of counting usages, for example. At this time, the processing for obtaining the first usage history may be performed for each time unit which is smaller than the time section. Furthermore, the processing for obtaining the first usage history may be performed, for example, every time a predetermined event takes place in the electrical device 300.

<Processing Operation of Anomaly Detection Apparatus 200>

Figure 5:
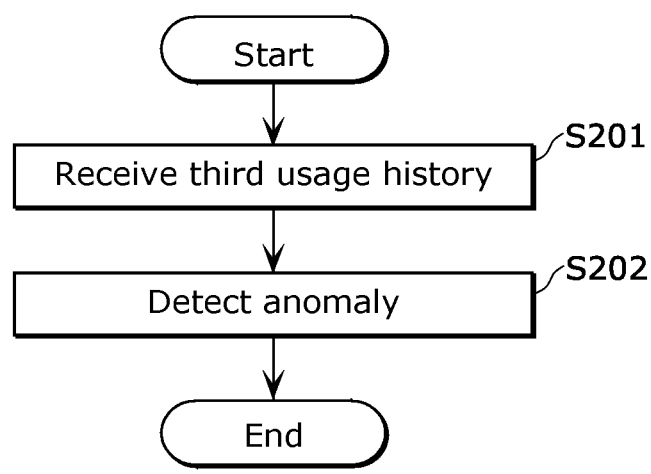
FIG. 5 is a flowchart illustrating a processing operation of an anomaly detection apparatus in Embodiment 1.
Figure 6:
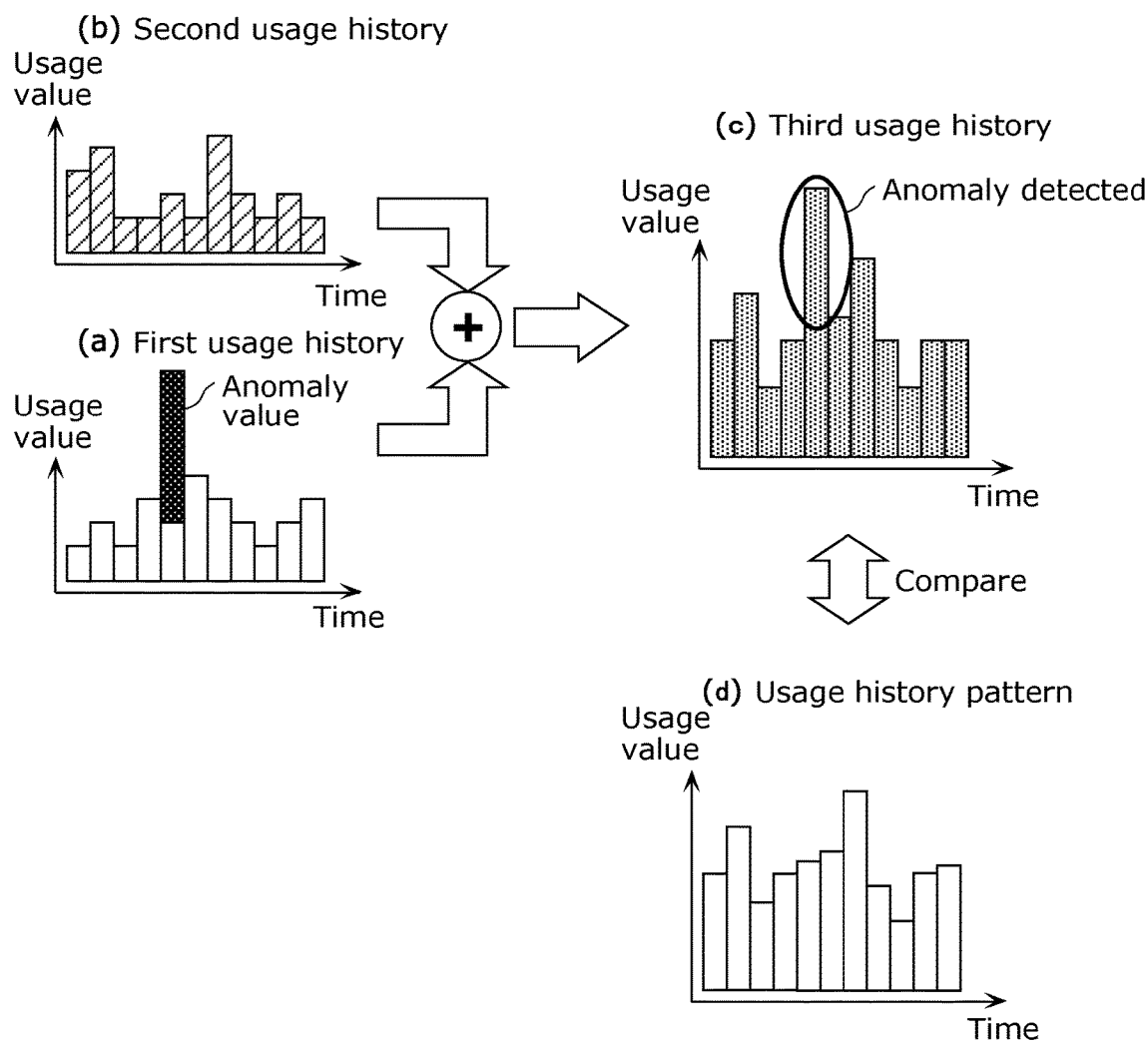
FIG. 6 is a view for explaining the processing operation of the anomaly detection apparatus in Embodiment 1.

Next, a processing operation of the anomaly detection apparatus 200 is specifically described with reference to FIG. 5 and FIG. 6. FIG. 5 is a flowchart illustrating a processing operation of the anomaly detection apparatus 200 in Embodiment 1. FIG. 6 is a view for explaining the processing operation of the anomaly detection apparatus 200 in Embodiment 1.

Firstly, the receiving unit 201 receives the third usage history from the transmitting apparatus 100 (S201).

Subsequently, the detection unit 202 compares the third usage history and the usage history pattern for detecting an anomaly, to detect an anomaly in the living pattern of the user (S202). For example, assume that the first usage history includes an anomaly value (a value attributed to an anomaly inside the building) as illustrated in (a) of FIG. 6. In this case, the detection unit 202 compares the third usage history which includes the anomaly value and the dummy value ((c) of FIG. 6) with the usage history pattern ((d) of FIG. 6). As a result, the detection unit 202 detects that an anomaly is present in a time section in which the difference value of the usage value is greater than the threshold value as illustrated in (c) of FIG. 6.

Thus, using the third usage history, the anomaly detection apparatus 200 detects an anomaly in the living pattern of the user. It is to be noted that the cycle of time sections needs to be shared by the transmitting apparatus 100 and the anomaly detection apparatus 200, but does not always need to be fixed. In other words, the cycle of time sections may be changed in synchronization between the transmitting apparatus 100 and the anomaly detection apparatus 200. In this case, it is sufficient that the transmitting apparatus 100 uses the dummy usage history that corresponds to the cycle resulting from a change while the anomaly detection apparatus 200 uses the usage history pattern that corresponds to the cycle resulting from the change.

As above, according to the anomaly detection system 10 in this embodiment, the transmitting apparatus 100 is capable of transmitting, to the anomaly detection apparatus 200, the third usage history generated by combining the first usage history and the second usage history. Therefore, even if the third usage history is wrongly intercepted in the communication path, it is possible to reduce the occurrence of fraudulent procurement of the first usage history since the third usage history includes the combined second usage history. In other words, the transmitting apparatus 100 is capable of improving the safety against leakage of the first usage history.

Furthermore, according to the anomaly detection system 10, the anomaly detection apparatus 200 is capable of, by way of comparing the third usage history and the usage history pattern, detecting an anomaly in the living pattern of the user while protecting the privacy. This is due to the fact that since the second usage history is a fixed dummy usage history, a change in the first usage history means a change in the third usage history. Thus, there is no need to identify the first usage history in order to detect an anomaly in the living pattern of the user, with the result that the anomaly detection apparatus 200 is capable of improving the safety against leakage of the first usage history.

(Embodiment 2)

Figure 8:
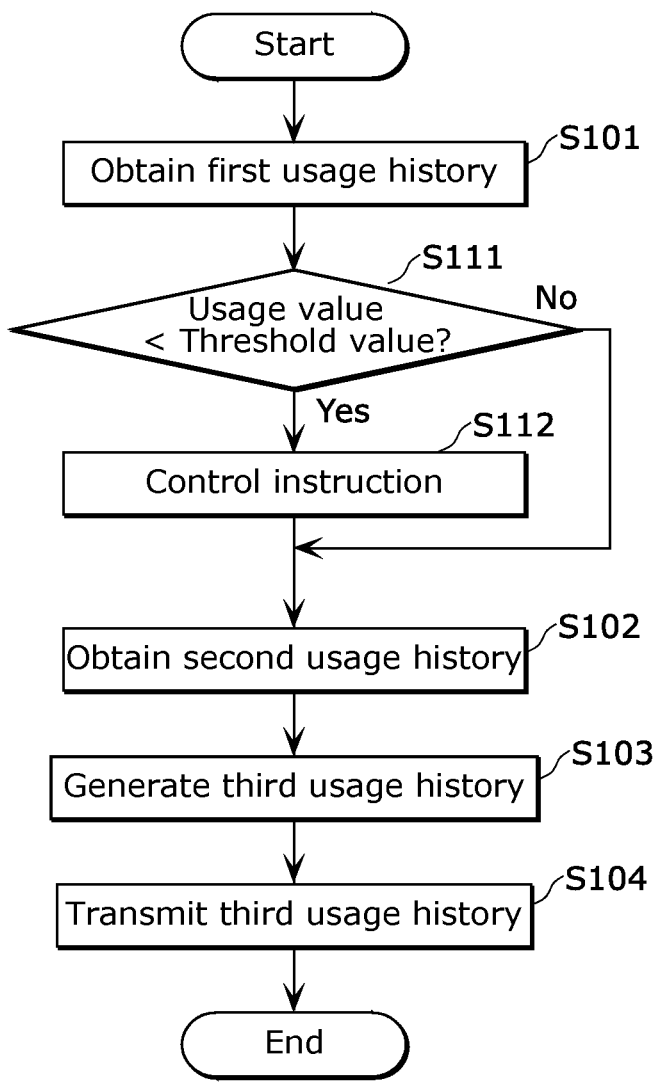
FIG. 8 is a flowchart illustrating a processing operation of a transmitting apparatus in Embodiment 2.
Figure 9:
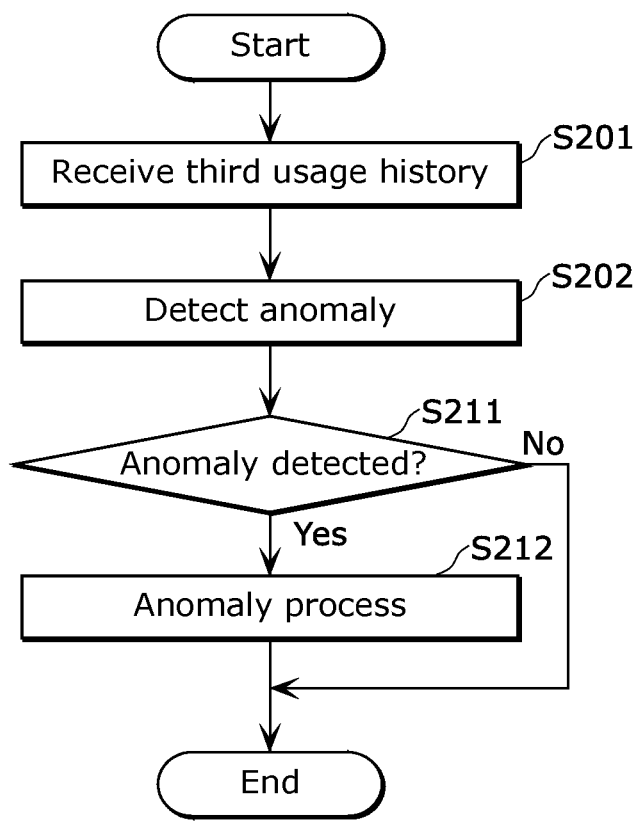
FIG. 9 is a flowchart illustrating a processing operation of an anomaly detection apparatus in Embodiment 2.

Next, Embodiment 2 is specifically described with reference to FIG. 7 to FIG. 9.

This embodiment is different from Embodiment 1 mainly in that the transmitting apparatus controls the electrical device 300 and that the anomaly detection apparatus performs an anomaly process when an anomaly is detected.

It is to be noted that in this embodiment, overlapping explanations of substantially the same structure as in Embodiment 1 may be omitted. The reason for this is to avoid the following description becoming unnecessarily redundant, thereby helping those skilled in the art easily understand it.

<Structure of Anomaly Detection System 20>

Figure 7:
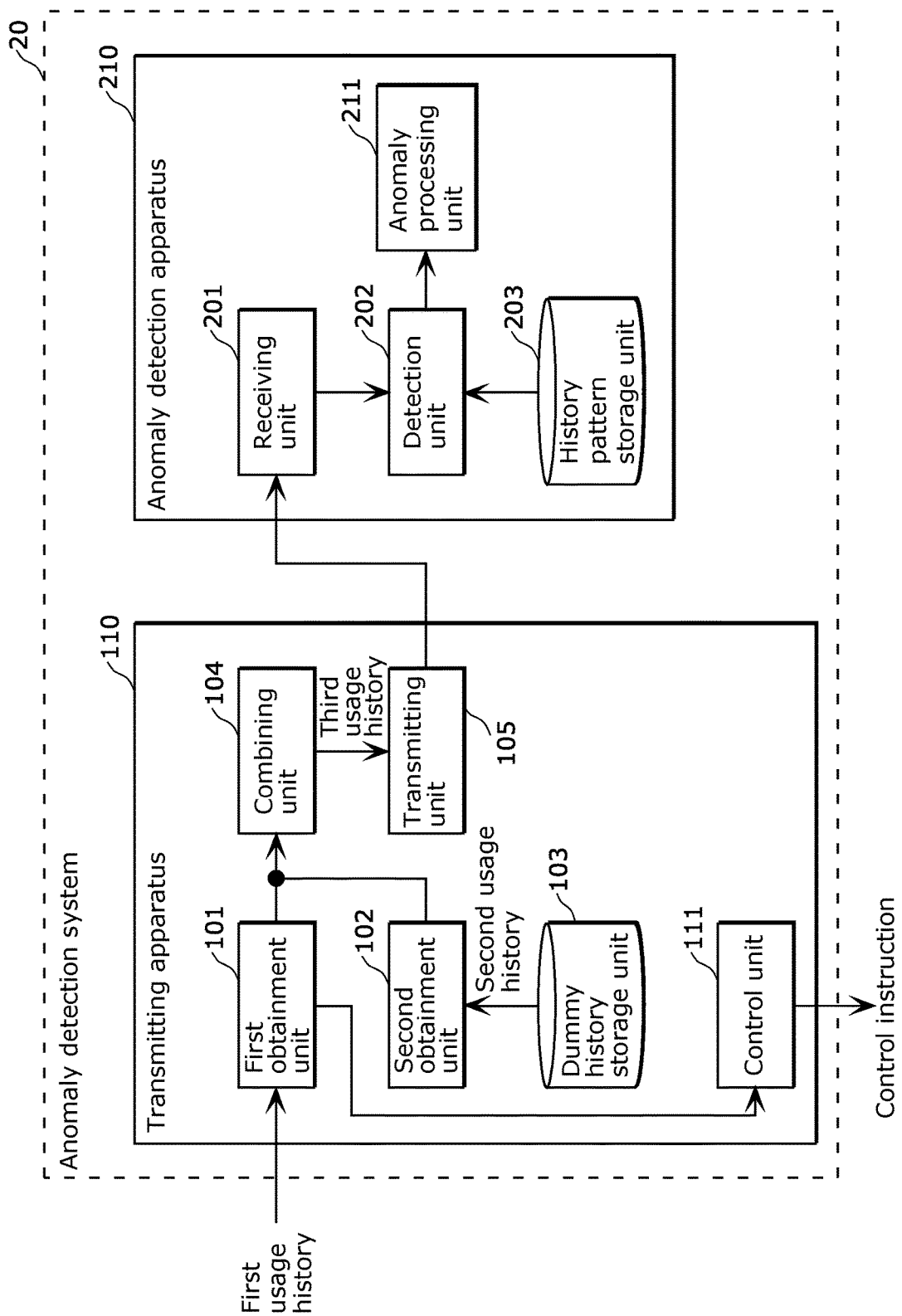
FIG. 7 is a block diagram illustrating a functional structure of an anomaly detection system in Embodiment 2.

FIG. 7 is a block diagram illustrating a structure of an anomaly detection system 20 in Embodiment 2. As illustrated in FIG. 7, the anomaly detection system 20 includes a transmitting apparatus 110 and an anomaly detection apparatus 210. The transmitting apparatus 110 is an example of the first apparatus, and the anomaly detection apparatus 210 is an example of the second apparatus.

<Structure of Transmitting Apparatus 110>

The transmitting apparatus 110 includes the first obtainment unit 101, the second obtainment unit 102, the dummy history storage unit 103, the combining unit 104, the transmitting unit 105, and a control unit 111. In short, the transmitting apparatus 110 further includes the control unit 111 in addition to the structural elements included in the transmitting apparatus 100 in Embodiment 1.

<Control Unit 111>

When the usage value included in the first usage history is less than a threshold value, the control unit 111 transmits a control instruction for increasing the usage value to the electrical device 300. For example, assume that the usage value indicates an amount of power consumed by the electrical device 300, when the usage value is less than a threshold value, the control unit 111 transmits, to the electrical device 300, an instruction to charge a storage battery included in the electrical device 300, as a control instruction for increasing the usage value. Furthermore, for example, assume that the usage value indicates the number of usages of a function, when the usage value is less than a threshold value, the control unit 111 transmits, to the electrical device 300, a control instruction for automatic use of the function.

Here, the threshold value is a value experientially or experimentally predetermined to prevent the dummy value from leaking.

<Structure of Anomaly Detection Apparatus 210>

The anomaly detection apparatus 210 includes the receiving unit 201, the detection unit 202, the history pattern storage unit 203, and an anomaly processing unit 211. In short, the anomaly detection apparatus 210 further includes the anomaly processing unit 211 in addition to the structural elements included in the anomaly detection apparatus 200 in Embodiment 1.

<Anomaly Processing Unit 211>

When an anomaly in the living pattern of the user is detected by the detection unit 202, the anomaly processing unit 211 performs processing appropriate for the detected anomaly. Specifically, when an anomaly in the living pattern of the user is detected, the anomaly processing unit 211 notifies a pre-registered terminal (e.g., a mobile phone and a smartphone) that the living pattern of the user contains the anomaly, for example. This allows the user to know the anomaly in the living pattern even when the user is away from the anomaly detection apparatus 210.

Furthermore, for example, when an anomaly in the living pattern of the user is detected, the anomaly processing unit 211 may switch a mode of a service provided to the user from a normal mode to an anomaly mode. Specifically, for example, when a situation of having a visitor (an anomaly in the living pattern of the user) is detected while a service to distribute advertisements selected for the user is provided, the anomaly processing unit 211 may switch to a mode for distributing advertisements unrelated to the privacy of the user. By doing so, it is possible to prevent preferences of the user from being exposed to the visitor. In the case of a watch service for a resident inside a house, it may be that, when an event different from an ordinary living pattern of the resident to be watched over (an anomaly in the living pattern of the user) is detected, notification is made through automatic e-mail transmission to a person who watches over the resident or through dialing to a particular phone number registered in advance. Thus, it is possible to watch over a particular person from a remote location.

<Processing Operation of Anomaly Detection System 20>

Next, each operation in the anomaly detection system 20 structured as above is specifically described with reference to the Drawings.

<Processing Operation of Transmitting Apparatus 110>

Firstly, a processing operation of the transmitting apparatus 110 is specifically described with reference to FIG. 8. FIG. 8 is a flowchart illustrating a processing operation of the transmitting apparatus 110 in Embodiment 2.

Firstly, the first obtainment unit 101 obtains the first usage history as does in Embodiment 1 (S101).

Subsequently, the control unit 111 determines whether or not a usage value included in the obtained first usage history is less than a threshold value (S111). Here, when the usage value included in the first usage history is less than the threshold value (Yes in S111), the control unit 111 transmits, to the electrical device 300, a control instruction for increasing the usage value (S112). On the other hand, when the usage value included in the first usage history is more than or equal to the threshold value (No in S111), the control unit 111 does not transmit, to the electrical device 300, the control instruction for increasing the usage value.

The transmitting apparatus 110 then performs the processing from Step S102 to Step S104 as does in Embodiment 1.

It is to be noted that the control unit 111 does not always need to perform the processing in Step S111 and Step S112. For example, the control unit 111 may perform Step S111 and Step S112 only when an away mode is set by the user.

<Processing Operation of Anomaly Detection Apparatus 210>

Next, a processing operation of the anomaly detection apparatus 210 is specifically described with reference to FIG. 9. FIG. 9 is a flowchart illustrating a processing operation of the anomaly detection apparatus 210 in Embodiment 2.

Firstly, the receiving unit 201 receives the third usage history from the transmitting apparatus 110 as does in Embodiment 1 (S201). Subsequently, the detection unit 202 detects an anomaly in the living pattern of the user based on the third usage history as does in Embodiment 1 (S202).

Here, when an anomaly is detected in the living pattern of the user (Yes in S211), the anomaly processing unit 211 performs an anomaly process (S212). In other words, the anomaly processing unit 211 performs processing appropriate for the detected anomaly. On the other hand, when no anomaly is detected in the living pattern of the user (No in S211), the anomaly processing unit 211 does not perform the anomaly process.

As above, according to the anomaly detection system 20 in this embodiment, when the usage value included in the first usage history is less than the threshold value, the transmitting apparatus 110 is capable of transmitting, to the electrical device 300, the control instruction for increasing the usage value. Therefore, the transmitting apparatus 110 is capable of making it less likely that the third usage history will match the second usage history, thereby reducing the occurrence of the second usage history being estimated from the third usage history. This means that the transmitting apparatus 110 is capable of making it less likely that the first usage history will be identified from the third usage history.

(Embodiment 3)

Next, Embodiment 3 is specifically described with reference to FIG. 10 to FIG. 14. Here, a case where the anomaly detection system includes a plurality of transmitting apparatuses is described.

Although the above Embodiments 1 and 2 mainly describe the case where the cycle of time section is a predetermined cycle which is fixed, the anomaly detection system can change the cycle of time section in this embodiment. Such an anomaly detection system is described below.

It is to be noted that in this embodiment, overlapping explanations of substantially the same structure as in Embodiment 1 or 2 may be omitted. The reason for this is to avoid the following description becoming unnecessarily redundant, thereby helping those skilled in the art easily understand it.

<Structure of Anomaly Detection System 30>

Figure 10:
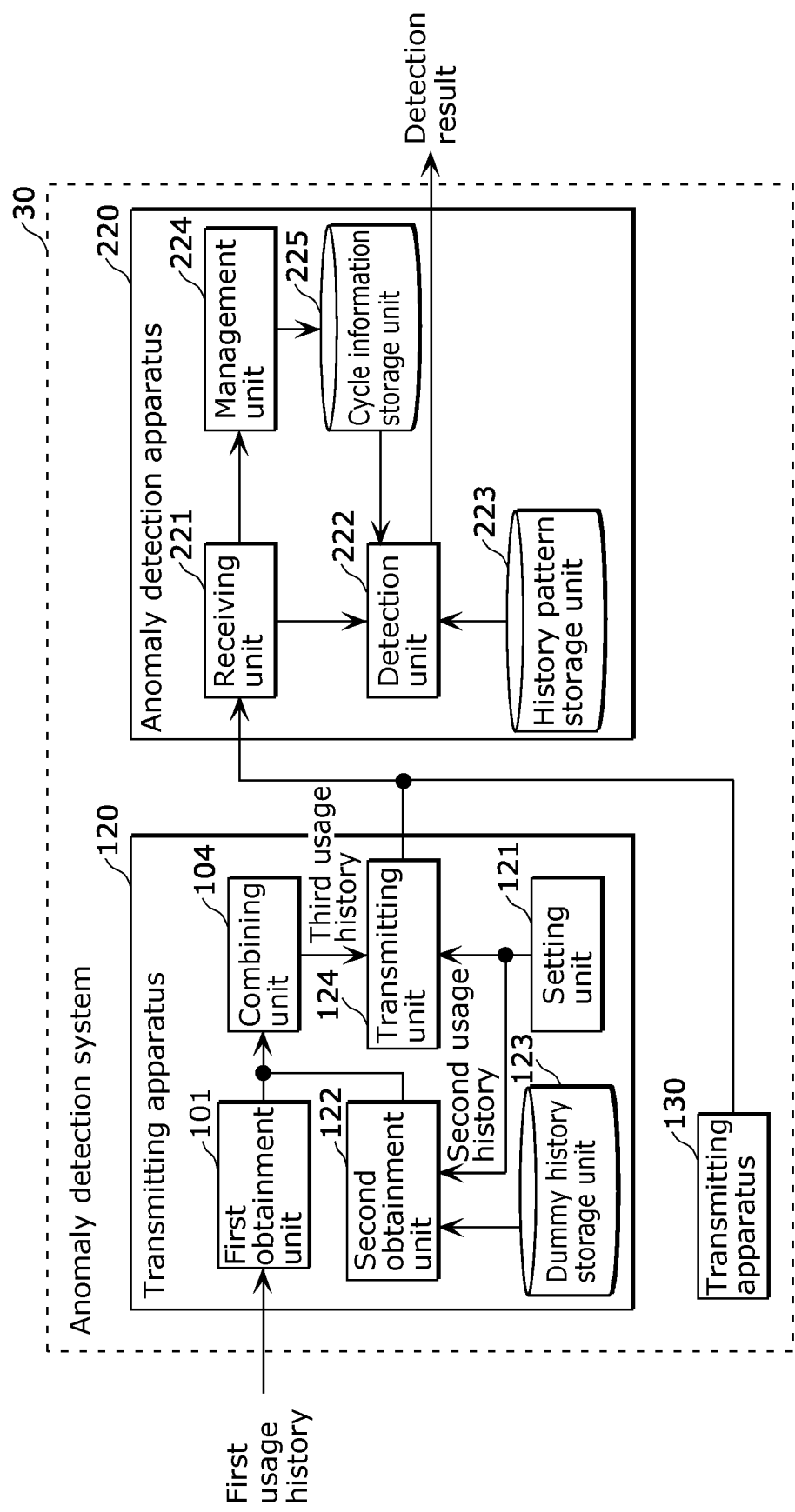
FIG. 10 is a block diagram illustrating a functional structure of an anomaly detection system in Embodiment 3.

FIG. 10 is a block diagram illustrating a structure of an anomaly detection system 30 in Embodiment 3. As illustrated in FIG. 10, the anomaly detection system 30 includes a transmitting apparatus 120 and an anomaly detection apparatus 220. Here, the anomaly detection system 30 further includes at least one other transmitting apparatus 130. Each of the transmitting apparatuses 120 and 130 is an example of the first apparatus, and the anomaly detection apparatus 220 is an example of the second apparatus.

The transmitting apparatus 130 obtains, as the first usage history, a usage history of at least one electrical device installed in a building different from that with the transmitting apparatus 120. Here, the structure of the transmitting apparatus 130 is the same or like as that of the transmitting apparatus 120; therefore, a description thereof is omitted.

<Structure of Transmitting Apparatus 120>

The transmitting apparatus 120 includes the first obtainment unit 101, the combining unit 104, a setting unit 121, a second obtainment unit 122, a dummy history storage unit 123, and a transmitting unit 124.

<Setting Unit 121>

The setting unit 121 sets cycle information of the time section. For example, the setting unit 121 accepts an instruction on the cycle information of the time section from the user and sets the cycle information according to the instruction. The cycle information which is set here is one day, one week, or one month, for example.

<Second Obtainment Unit 122>

The second obtainment unit 122 obtains, as the second usage history, the dummy usage history that corresponds to the set cycle information, from the dummy history storage unit 123. In other words, the second obtainment unit 122 obtains the second usage history that corresponds to the set cycle information from among a plurality of second usage histories. This means that the second obtainment unit 122 obtains, as the second usage history, the dummy usage history that includes the usage value for each time section with the cycle indicated in the set cycle information. For example, in the case where the set cycle information is one day, the second obtainment unit 122 obtains, as the second usage history, a one-day-cycle dummy usage history from among a plurality of dummy usage histories stored in the dummy history storage unit 123.

<Dummy History Storage Unit 123>

The dummy history storage unit 123 holds a plurality of dummy usage histories which correspond to respective pieces of the cycle information. For example, the dummy history storage unit 123 holds the dummy usage histories which correspond to the respective cycles of one day, one week, and one month.

<Transmitting Unit 124>

The transmitting unit 124 transmits, to the anomaly detection apparatus 220, the third usage history generated by the combining unit 104, as in Embodiment 1. Furthermore, the transmitting unit 124 transmits the set cycle information to the anomaly detection apparatus 220.

<Structure of Anomaly Detection Apparatus 220>

The anomaly detection apparatus 220 includes a receiving unit 221, a detection unit 222, a history pattern storage unit 223, a management unit 224, and a cycle information storage unit 225. The following describes each structural element included in the anomaly detection apparatus 220.

<Receiving Unit 221>

The receiving unit 221 receives the third usage history from the transmitting apparatus 120 as does in Embodiment 1. Furthermore, the receiving unit 221 receives the cycle information from the transmitting apparatus 120 or 130.

<Detection Unit 222>

The detection unit 222 obtains, from the history pattern storage unit 223, the usage history pattern that corresponds to the cycle indicated in the cycle information. The detection unit 222 then detects an anomaly in the living pattern of the user using the obtained usage history pattern as in Embodiment 1.

Specifically, the detection unit 222 identifies, from among the plurality of transmitting apparatuses, a transmitting apparatus from which the received third usage history originates. The detection unit 222 then obtains, from the cycle information storage unit 225, the cycle information that corresponds to the identified transmitting apparatus. Subsequently, the detection unit 222 obtains the usage history pattern that corresponds to the obtained cycle information. Afterwards, the detection unit 222 detects an anomaly in the living pattern of the user using the obtained usage history pattern.

<History Pattern Storage Unit 223>

The history pattern storage unit 223 holds a plurality of usage history patterns which correspond to respective pieces of the cycle information. Here, the history pattern storage unit 223 holds the usage history patterns which correspond to the respective cycles of one day, one week, and one month, for example.

<Management Unit 224>

The management unit 224 stores, into the cycle information storage unit 225, the cycle information received by the receiving unit 221, in association with the transmitting apparatus from which the received cycle information originates. In detail, the management unit 224 stores, into the cycle information storage unit 225, the cycle information received from each of the transmitting apparatuses (the transmitting apparatuses 120 and 130), in association with the transmitting apparatus from which the received cycle information originates. Specifically, the management unit 224 stores, into the cycle information storage unit 225, the received cycle information in association with a communication address, a physical address, or a device identifier of the transmitting apparatus from which the received cycle information originates, for example. The device identifier may be included in the cycle information, for example.

<Cycle Information Storage Unit 225>

The cycle information storage unit 225 is a nonvolatile storage device such as a HDD or a semiconductor memory, for example. The cycle information storage unit 225 holds the cycle information in association with each of the transmitting apparatuses included in the anomaly detection system 30. Here, the cycle information storage unit 225 holds the cycle information that corresponds to the transmitting apparatus 120 and the cycle information that corresponds to the transmitting apparatus 130.

<Processing Operation of Anomaly Detection System 30>

Next, each operation in the anomaly detection system 30 structured as above is specifically described with reference to the Drawings.

<Processing Operation of Transmitting Apparatus 120>

Figure 11:
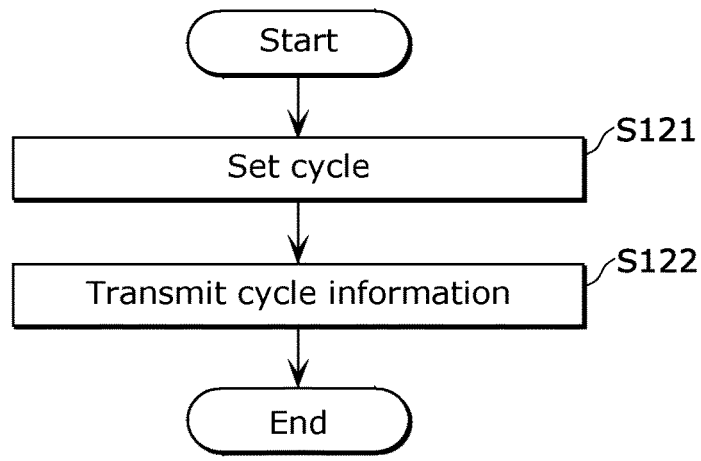
FIG. 11 is a flowchart illustrating a cycle-related processing operation of a transmitting apparatus in Embodiment 3.
Figure 12:
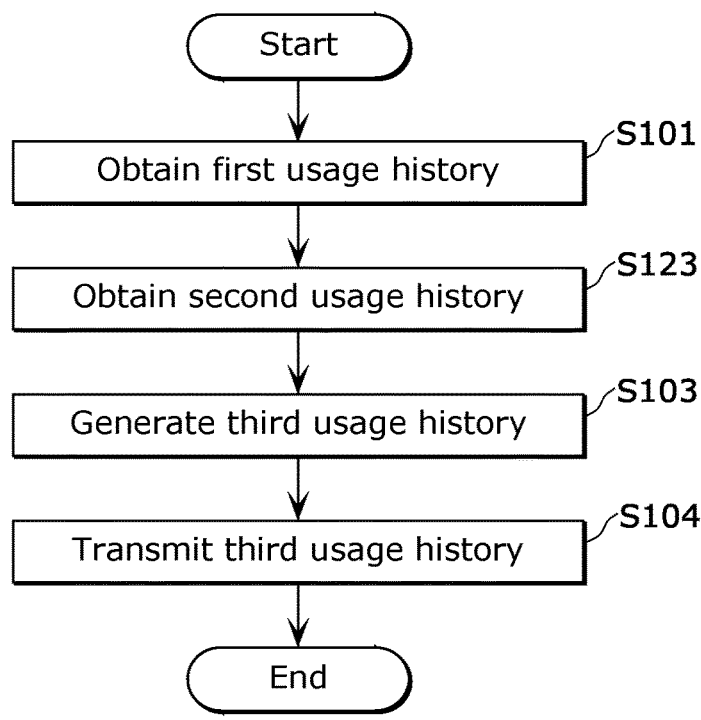
FIG. 12 is a flowchart illustrating a usage-history-related processing operation of the transmitting apparatus in Embodiment 3.

Firstly, a processing operation of the transmitting apparatus 120 is specifically described with reference to FIG. 11 and FIG. 12. FIG. 11 is a flowchart illustrating a cycle-related processing operation of the transmitting apparatus 120 in Embodiment 3. FIG. 12 is a flowchart illustrating a usage-history-related processing operation of the transmitting apparatus 120 in Embodiment 3.

Firstly, FIG. 11 is described.

The setting unit 121 sets the cycle information of the time section (S121). For example, the setting unit 121 sets the cycle information of the time section according to a user's instruction accepted through an input device. It may also be that the setting unit 121 analyzes cyclicity of the first usage history and thereby automatically sets the cycle information of the time section, for example.

Subsequently, the transmitting unit 124 transmits the set cycle information to the anomaly detection apparatus 220 (S122).

Next, FIG. 12 is described.

The first obtainment unit 101 obtains the first usage history as does in Embodiment 1 (S101). Subsequently, the second obtainment unit 122 obtains, as the second usage history, the dummy usage history that corresponds to the set cycle information, from the dummy history storage unit 123 (S123).

The transmitting apparatus 120 then performs the processing in Step S103 and Step S104 as does in Embodiment 1.

<Processing Operation of Anomaly Detection Apparatus 220>

Figure 13:
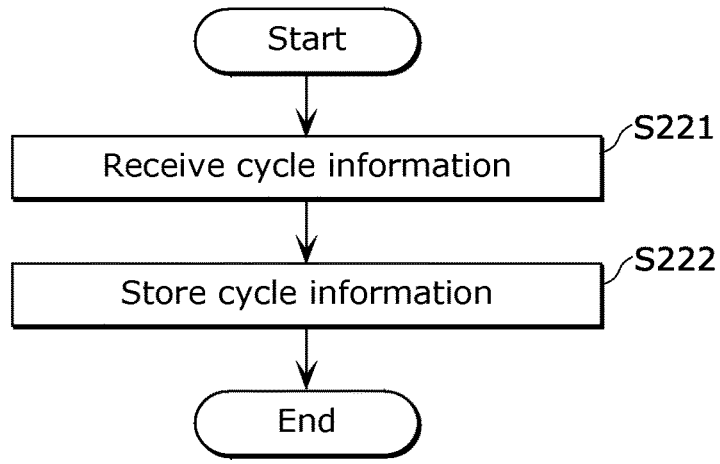
FIG. 13 is a flowchart illustrating a cycle-related processing operation of an anomaly detection apparatus in Embodiment 3.
Figure 14:
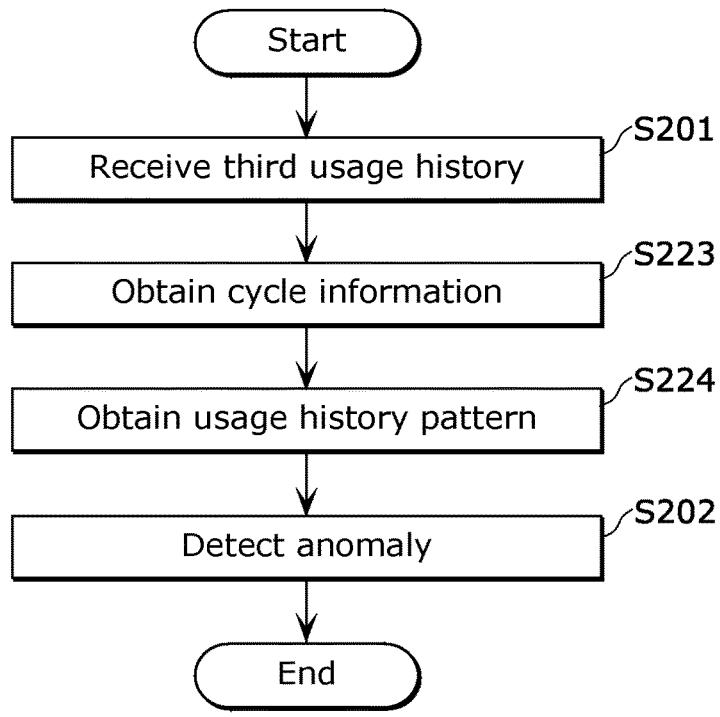
FIG. 14 is a flowchart illustrating a usage-history-related processing operation of the anomaly detection apparatus in Embodiment 3.

Next, a processing operation of the anomaly detection apparatus 220 is specifically described with reference to FIG. 13 and FIG. 14. FIG. 13 is a flowchart illustrating a cycle-related processing operation of the anomaly detection apparatus 220 in Embodiment 3. FIG. 14 is a flowchart illustrating a usage-history-related processing operation of the anomaly detection apparatus 220 in Embodiment 3. Here, a case of receiving the cycle information and the third usage history from the transmitting apparatus 120 is described.

Firstly, FIG. 13 is described.

The receiving unit 221 receives the cycle information from the transmitting apparatus 120 (S221). Next, the management unit 224 stores the cycle information into the cycle information storage unit 225 in association with the transmitting apparatus from which the cycle information originates (which is the transmitting apparatus 120 in this case) (S222).

Next, FIG. 14 is described.

The receiving unit 221 receives the third usage history from the transmitting apparatus 120 as does in Embodiment 1 (S201). Subsequently, the detection unit 222 obtains, from the cycle information storage unit 225, the cycle information that corresponds to the transmitting apparatus from which the received third usage history originates (which is the transmitting apparatus 120 in this case) (S223). Furthermore, the detection unit 222 obtains, from the history pattern storage unit 223, the usage history pattern that corresponds to the obtained cycle information (S224). At the end, the detection unit 222 detects an anomaly in the living pattern of the user using the obtained usage history pattern as does in Embodiment 1 (S202).

As above, in the anomaly detection system 30 according to this embodiment, the transmitting apparatus 120 is capable of setting the cycle information of the time section. The set cycle information is then transmitted to the anomaly detection apparatus 220. Therefore, the cycle information can be changed, and by setting appropriate cycle information, it is possible to improve the accuracy of detecting an anomaly in the living pattern of the user.

Furthermore, in the anomaly detection system 30 according to this embodiment, the transmitting apparatus 120 and the anomaly detection apparatus 220 can share the cycle information, which makes it possible to set appropriate cycle information according to the use status of the electrical device and so on. Therefore, the safety against leakage of the usage history of the electrical device can be improved.

Furthermore, in the anomaly detection system 30 according to this embodiment, the cycle information can be stored into the cycle information storage unit 225 in association with the transmitting apparatus from which the cycle information originates. Therefore, different cycle information can be used for each transmitting apparatus, with the result that the accuracy of detecting an anomaly in the living pattern of the user can be improved.

It is to be noted that although the transmitting unit 124 transmits the cycle information and the third usage history separately in this embodiment, the transmitting unit 124 may transmit, at the time of transmitting the third usage history, the cycle information together therewith. In this case, the anomaly detection apparatus 220 does not need to manage the cycle information in association with the transmitting apparatus from which the cycle information originates. This means that the anomaly detection apparatus 220 does not need to include the management unit 224 or the cycle information storage unit 225. In this case, it is sufficient that the detection unit 222 obtains, from the history pattern storage unit 223, the usage history pattern that corresponds to the cycle information received together with the third usage history.

(Variation of Embodiment 3)

Next, Variation of Embodiment 3 is described. In this variation, the instruction on the cycle information is received from the user through a graphical user interface (GUI). In this variation, a case where the GUI is displayed on a touch screen is described.

Figure 15:
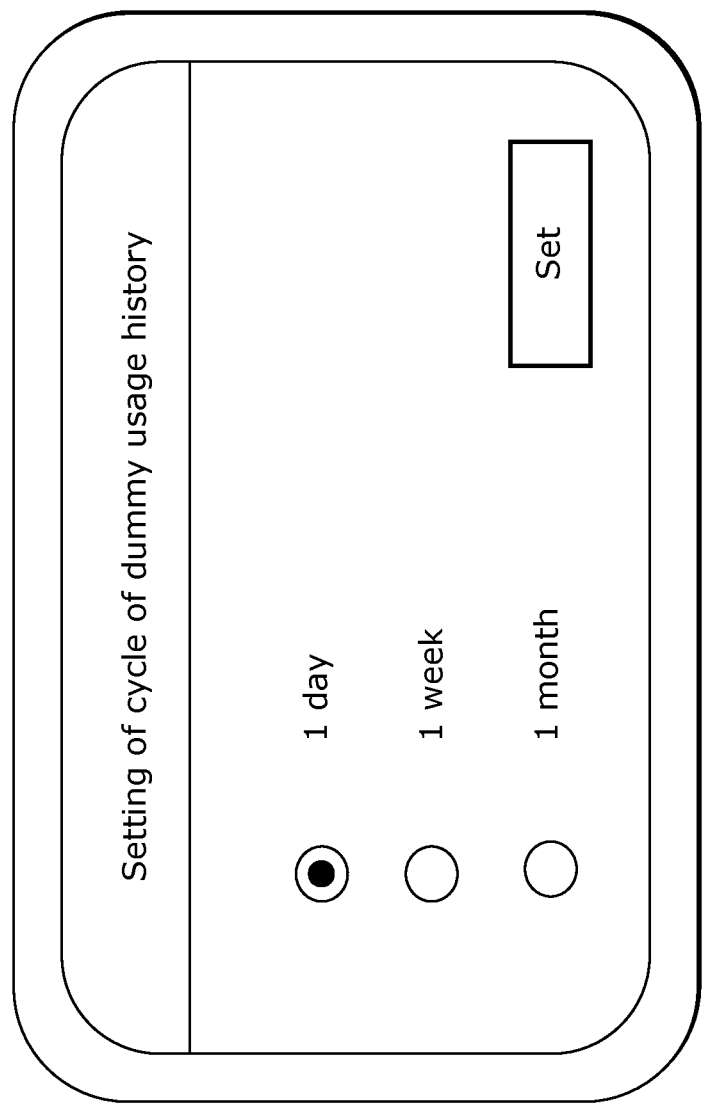
FIG. 15 illustrates an example of a graphical user interface (GUI) in Variation of Embodiment 3.

FIG. 15 illustrates an example of the GUI in Variation of Embodiment 3. In FIG. 15, the cycle information is specified using a radio button (which may be also referred to as an option button).

Specifically, the user selects one of the predefined pieces of cycle information (e.g., "1 day") by touching the radio button. The user then touches a push button "Set" and thereby specifies that the cycle information selected by the radio button be set.

Figure 16:
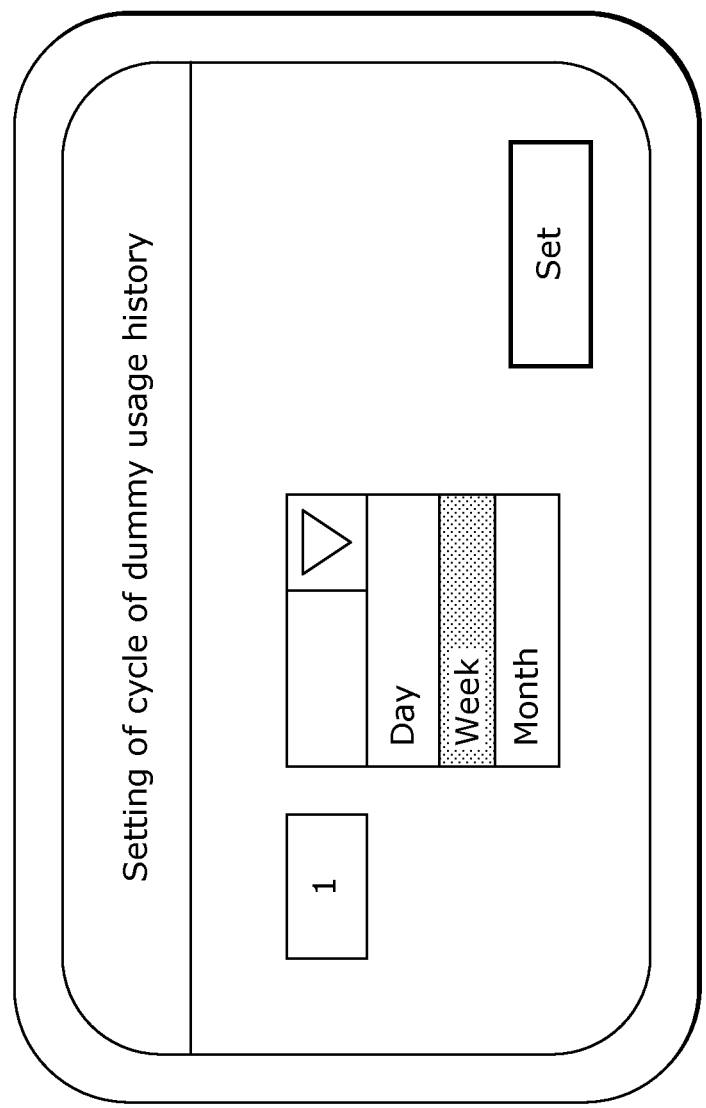
FIG. 16 illustrates another example of the GUI in Variation of Embodiment 3.

FIG. 16 illustrates another example of the GUI in Variation of Embodiment 3. In FIG. 16, the cycle information is specified using a text box and a drop-down list.

Specifically, the user inputs a numerical value into the text box and selects a unit of the cycle from the drop-down list, thereby inputting the cycle information (e.g., "1 week). The user then touches the push button "Set" and thereby specifies that the inputted cycle information be set.

Next, a verification screen for the third usage history which is displayed at the time of setting the cycle information is described with reference to FIG. 17 and FIG. 18.

Figure 17:
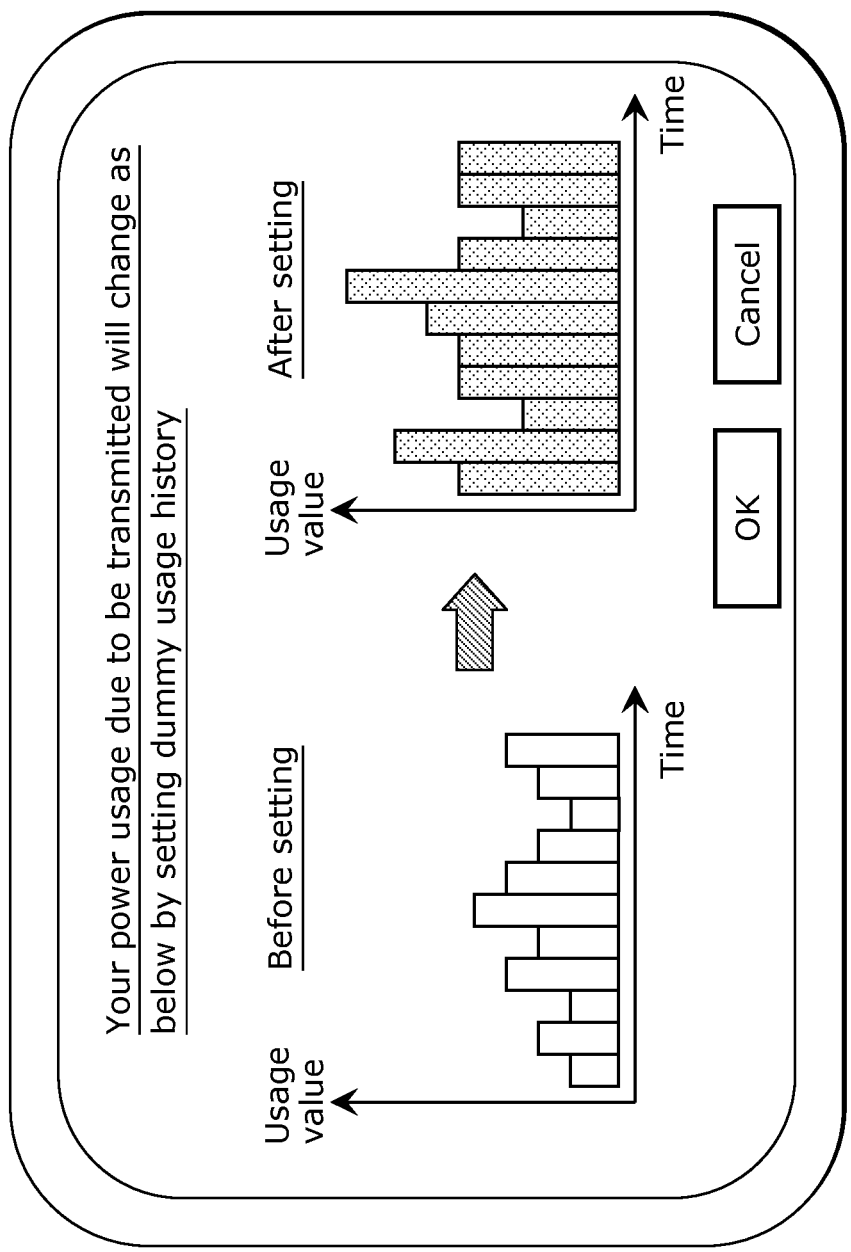
FIG. 17 is an example of a verification screen for a third usage history in Variation of Embodiment 3.

FIG. 17 is an example of the verification screen for the third usage history in Variation of Embodiment 3. For example, the first usage history and the third usage history are displayed as illustrated in FIG. 17 after the push button "Set" in FIG. 15 or FIG. 16 is touched. Subsequently, when the push button "OK" in FIG. 17 is touched, the cycle information specified by the user is set. On the other hand, when the push button "Cancel" in FIG. 17 is touched, the cycle information specified by the user is not set.

This means that, before the cycle information specified by the user through the GUI such as that in FIG. 15 or FIG. 16 is set, the first usage history and the third usage history which will be obtained after the cycle information is set are displayed. Therefore, before the cycle information is set, the user can check whether or not, after the cycle information is set, the privacy will be protected.

Figure 18:
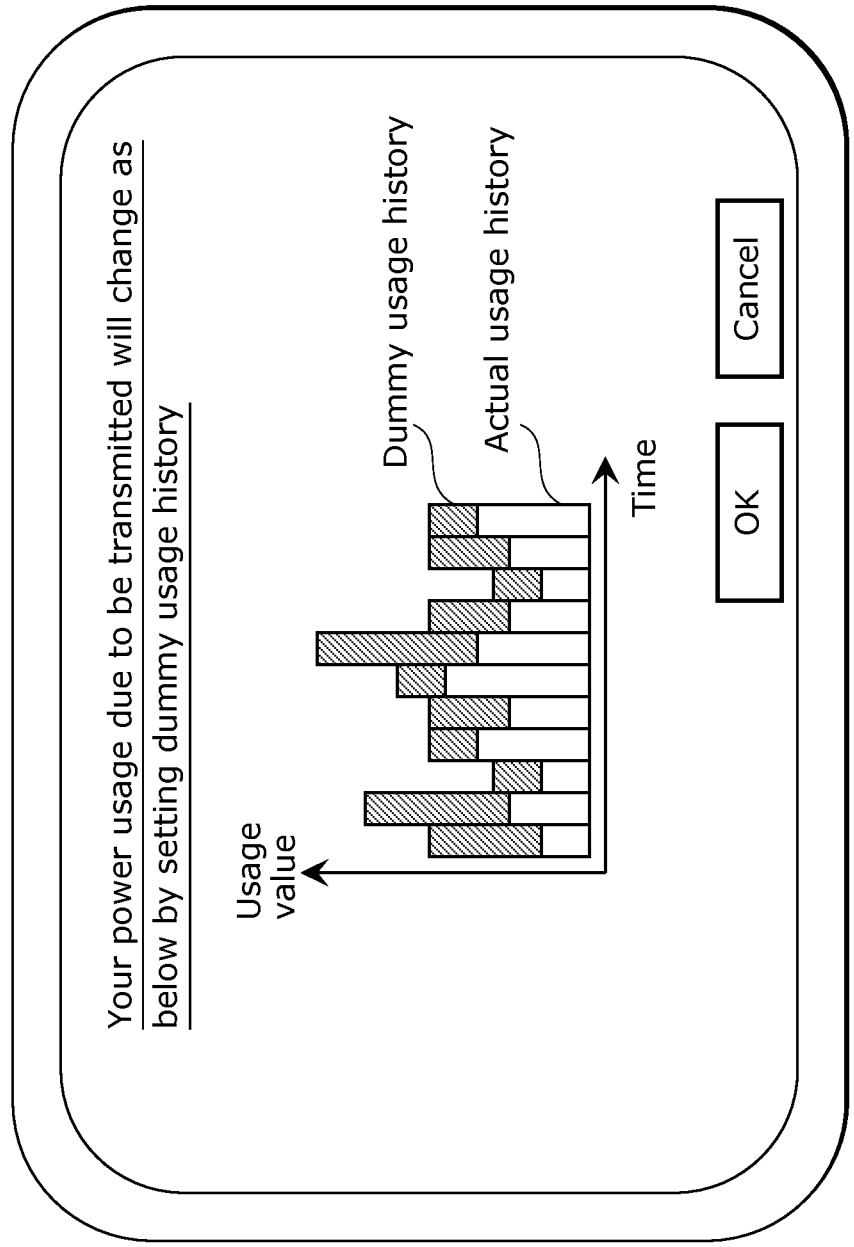
FIG. 18 is another example of the verification screen for the third usage history in Variation of Embodiment 3.

FIG. 18 is another example of the verification screen for the third usage history in Variation of Embodiment 3. In FIG. 18, the third usage history is displayed such that the first usage history (an actual usage history) and the second usage history (the dummy usage history) are distinguishable from each other.

Figure 19:
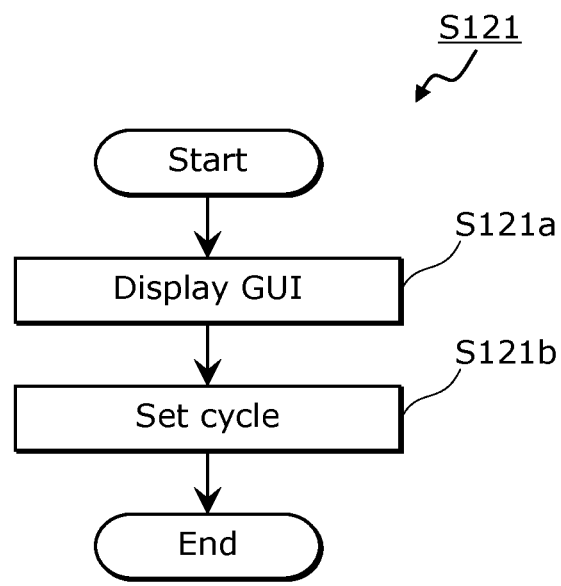
FIG. 19 is a flowchart illustrating details of processing for setting cycle information in Variation of Embodiment 3.

Next, processing for setting the cycle information as above is described with reference to the Drawing. FIG. 19 is a flowchart illustrating details of the processing for setting the cycle information in Variation of Embodiment 3. In other words, FIG. 19 illustrates details of Step S121 illustrated in FIG. 11.

Firstly, the setting unit 121 displays a GUI for specifying the cycle information (S121a). Specifically, the setting unit 121 displays the GUI illustrated in FIG. 15 or FIG. 16, for example.

Next, the setting unit 121 sets the cycle information specified by the user through the displayed GUI (S121b). Specifically, the setting unit 121 sets the specified cycle information when the set button is pressed in the GUI illustrated in FIG. 15 or FIG. 16 and the OK button is pressed in FIG. 17 or FIG. 18, for example.

As above, in this variation, it is possible to set the cycle information specified by the user through the GUI, so that the convenience of the user can be improved.

Furthermore, in this variation, the first usage history and the third usage history which will be obtained after the cycle information is set can be displayed before the cycle information is set. Thus, the user can check in advance whether or not the cycle information improves the safety against leakage of the usage history.

It is to be noted that although the verification screen as illustrated in FIG. 17 or FIG. 18 is displayed before the cycle information is set in this variation, it may be that the verification screen is not displayed. In this case, it may be sufficient that the cycle information is set immediately after the push button "Set" is touched in FIG. 15 or FIG. 16, for example.

It is to be noted that the GUI in each of FIG. 15 to FIG. 18 is an example and not necessarily the only example. For example, other GUI components (widgets) may be used as the GUI. For example, the GUI may include a check box or a slider. Furthermore, for example, the text box or drop-down list in FIG. 16 may be replaced by a combo box.

It is to be noted that although the case where the cycle information is specified by the user through the touch screen is described in this variation, the cycle information may be specified by the user through other input devices (e.g., a mouse or a keyboard).

(Embodiment 4)

Next, Embodiment 4 is specifically described with reference to FIG. 20 to FIG. 23. In this embodiment, the transmitting apparatus obtains the third history information stored in the anomaly detection apparatus and restores the first history information from the obtained third history information.

It is to be noted that in this embodiment, overlapping explanations of substantially the same structure as in Embodiment 1 or 2 may be omitted. The reason for this is to avoid the following description becoming unnecessarily redundant, thereby helping those skilled in the art easily understand it.

<Structure of Anomaly Detection System 40>

Figure 20:
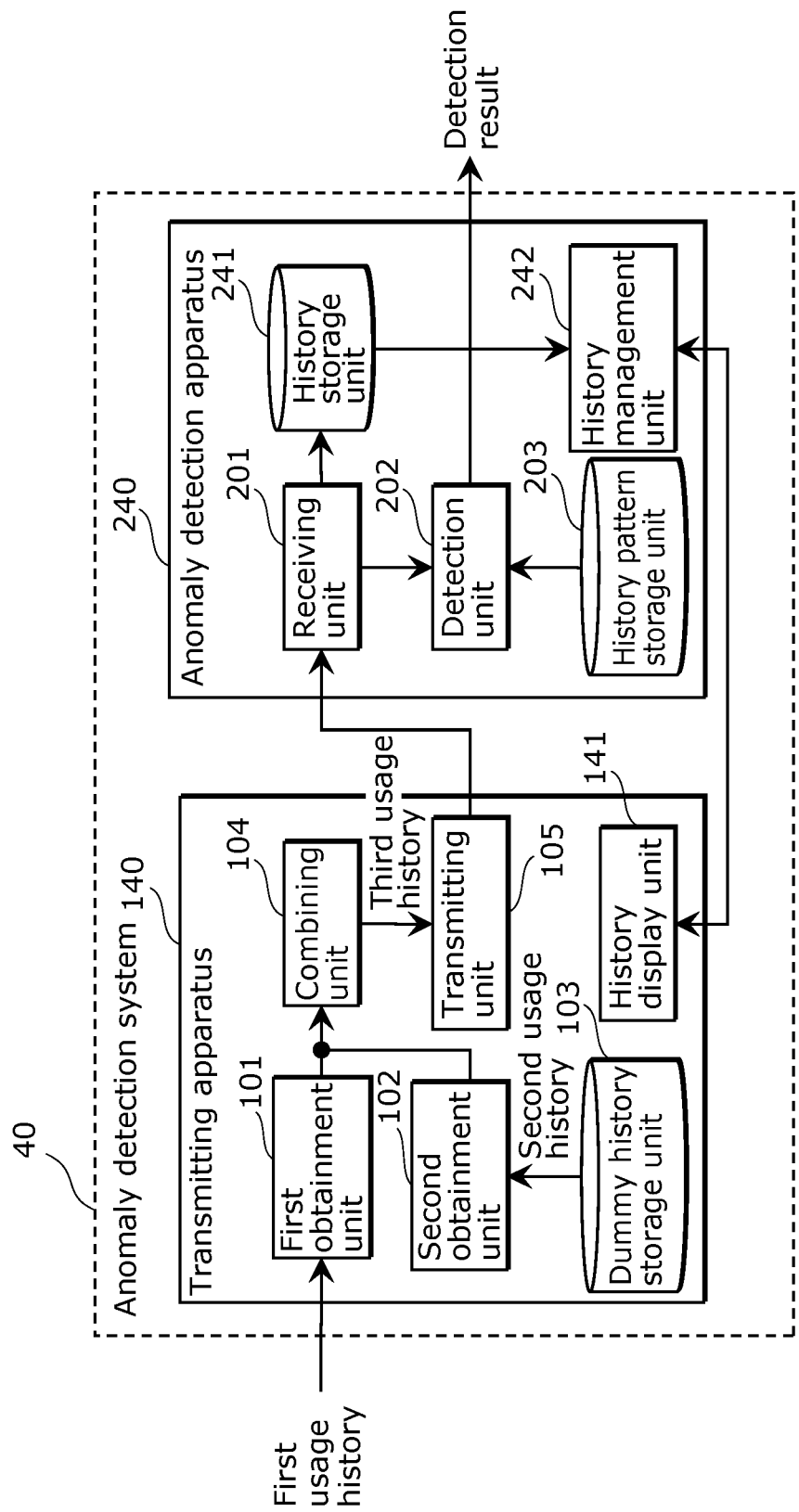
FIG. 20 is a block diagram illustrating a structure of an anomaly detection system in Embodiment 4.

FIG. 20 is a block diagram illustrating a structure of an anomaly detection system 40 in Embodiment 4. As illustrated in FIG. 20, the anomaly detection system 40 includes a transmitting apparatus 140 and an anomaly detection apparatus 240. The transmitting apparatus 140 is an example of the first apparatus, and the anomaly detection apparatus 240 is an example of the second apparatus.

<Structure of Transmitting Apparatus 140>

The transmitting apparatus 140 includes the first obtainment unit 101, the second obtainment unit 102, the dummy history storage unit 103, the combining unit 104, the transmitting unit 105, and a history display unit 141. In short, the transmitting apparatus 140 further includes the history display unit 141 in addition to the structural elements included in the transmitting apparatus 100 in Embodiment 1.

<History Display Unit 141>

The history display unit 141 transmits, to the anomaly detection apparatus 240, a request message for the third usage history stored in a history storage unit 241 of the anomaly detection apparatus 240. The history display unit 141 then receives the third usage history from the anomaly detection apparatus 240 as a response to the request message.

Furthermore, the history display unit 141 restores, using the second usage history, the first usage history from the third usage history received from the anomaly detection apparatus 240. Specifically, the history display unit 141 restores an actual usage history by removing the dummy usage history from the received third usage history. The history display unit 141 then displays the restored first usage history.

<Structure of Anomaly Detection Apparatus 240>

The anomaly detection apparatus 240 includes the receiving unit 201, the detection unit 202, the history pattern storage unit 203, the history storage unit 241, and a history management unit 242. In short, the anomaly detection apparatus 240 further includes the history storage unit 241 and the history management unit 242 in addition to the structural elements included in the anomaly detection apparatus 200 in Embodiment 1.

<History Storage Unit 241>

The history storage unit 241 holds the third usage history received from the transmitting apparatus 140. In other words, the third usage history is stored by the receiving unit 201 into the history storage unit 241.

<History Management Unit 242>

The history management unit 242 receives the request message from the transmitting apparatus 140. The history management unit 242 then transmits, to the transmitting apparatus 140, the third usage history data stored in the history storage unit 241, in compliance with the request message. For example, the history management unit 242 transmits, to the transmitting apparatus 140, the third usage history that corresponds to information included in the request message.

<Processing Operation of Anomaly Detection System 20>

Next, each operation in the anomaly detection system 40 structured as above is specifically described with reference to the Drawings.

<Processing Operation of Anomaly Detection Apparatus 240>

Figure 21:
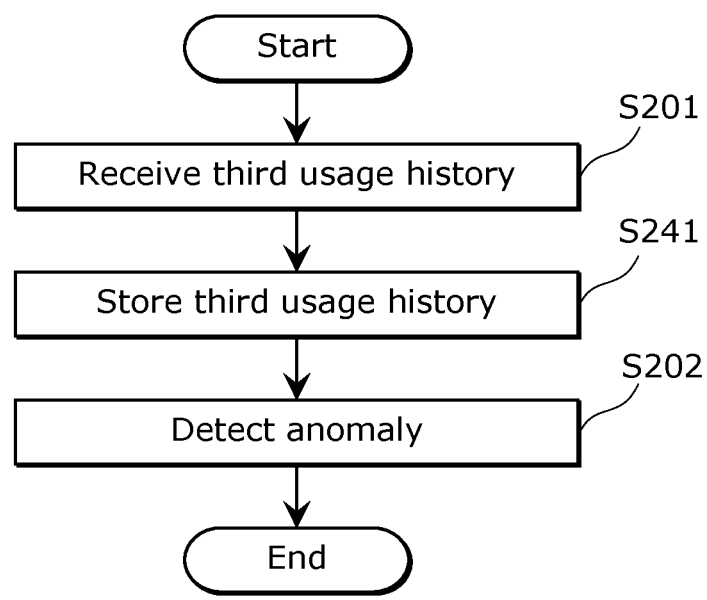
FIG. 21 is a flowchart illustrating a processing operation of an anomaly detection apparatus in Embodiment 4.

A processing operation of the anomaly detection apparatus 240 is specifically described with reference to FIG. 21. FIG. 21 is a flowchart illustrating a processing operation of the anomaly detection apparatus 240 in Embodiment 4.

Firstly, the receiving unit 201 receives the third usage history from the transmitting apparatus 140 as does in Embodiment 1 (S201). The receiving unit 201 stores the received third usage history into the history storage unit 241 (S241). The detection unit 202 detects an anomaly in the living pattern of the user based on the third usage history as does in Embodiment 1 (S202).

<Processing Operation of Transmitting Apparatus 140>

Figure 22:
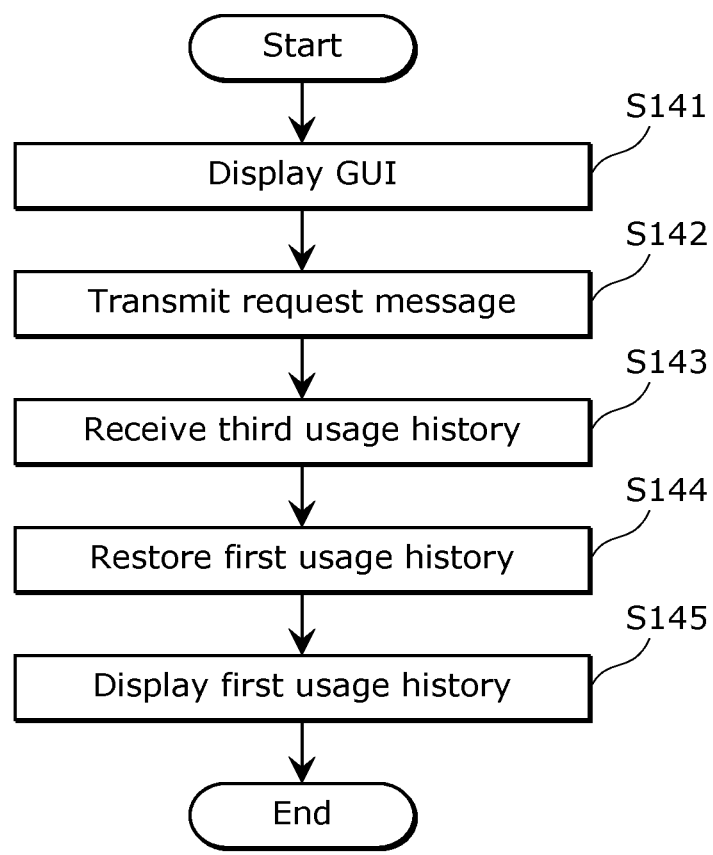
FIG. 22 is a flowchart illustrating a processing operation of a transmitting apparatus in Embodiment 4.

Next, a processing operation of the transmitting apparatus 140 is specifically described with reference to FIG. 22. FIG. 22 is a flowchart illustrating a processing operation of the transmitting apparatus 140 in Embodiment 4. Specifically, FIG. 22 is a flowchart illustrating a history-view-related processing operation.

The history display unit 141 displays a GUI for specifying information related to the first usage history that is to be restored (S141). The information related to the first usage history that is to be restored is information for the user to obtain the first usage history. Specifically, this information is information indicating a period of the first usage history, for example. This information may be information indicating at least one electrical device among a plurality of electrical devices, for example. This information may also be information indicating both the period and the electrical device, for example.

The history display unit 141 transmits the request message (S142). At this time, the request message includes the information specified by the user through the GUI (the information related to the first usage history that is to be restored).

The history display unit 141 receives the third usage history that corresponds to the information included in the request message (S143). This means that the history management unit 242 of the anomaly detection apparatus 240 reads, from the history storage unit 241, the third usage history that corresponds to the information included in the request message, and transmits the read third usage history to the transmitting apparatus 140. For example, when the information included in the request message indicates a period, the history management unit 242 transmits the third usage history obtained for the period.

The history display unit 141 restores, using the second usage history, the first usage history from the third usage history received from the anomaly detection apparatus 240 (S144). For example, the history display unit 141 restores the first usage history by subtracting a value included in the second usage history from a value included in the third usage history.

The history display unit 141 displays the restored first usage history (S145).

Figure 23:
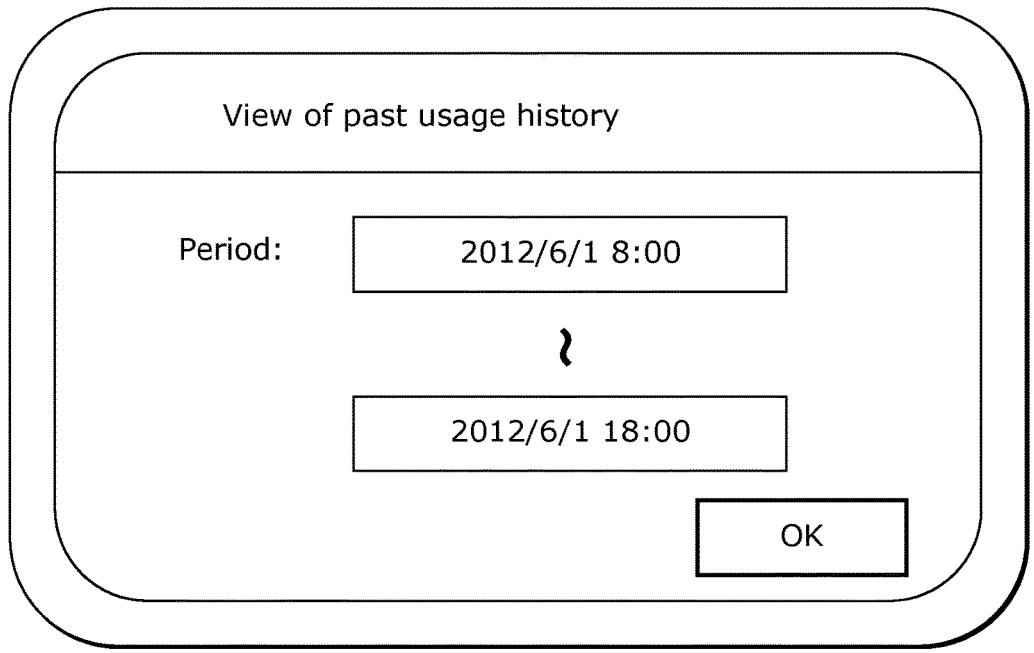
FIG. 23 illustrates an example of a GUI in Embodiment 4.
Figure 23:
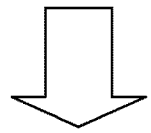
Figure 23:
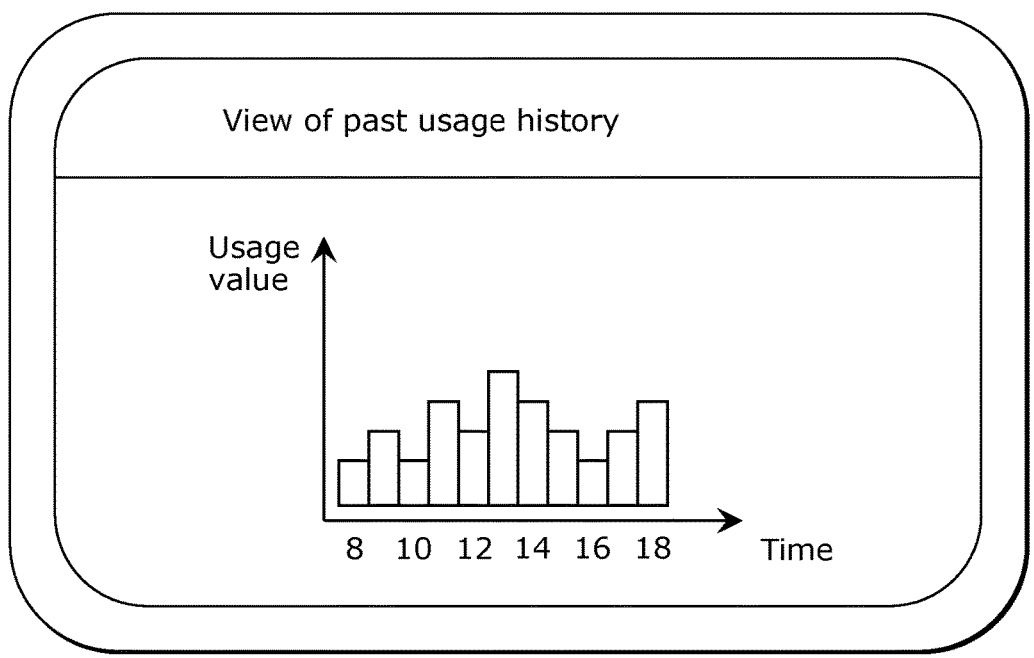

FIG. 23 illustrates an example of the GUI in Embodiment 4. Specifically, an example of the GUI displayed in Step S141 is illustrated in (a) of FIG. 23, and an example of the first usage history displayed in Step S145 is illustrated in (b) of FIG. 23.

On the GUI in (a) of FIG. 23, the start of the period (8 o'clock on Jun. 1, 2012) and the end of the period (18 o'clock on Jun. 1, 2012) are input by the user. When the push button "OK" is pressed, then the request message including information indicating the inputted start and end of the period is transmitted to the anomaly detection apparatus 240.

In (b) of FIG. 23, the restored first usage history is displayed. This first usage history is a usage history obtained for the period inputted in (a) of FIG. 23.

As above, in the anomaly detection system 40 according to this embodiment, the first usage history can be restored in the transmitting apparatus 140 from the third usage history received from the anomaly detection apparatus 240. Therefore, even when the past first usage history is not held in the transmitting apparatus 140, for example, the transmitting apparatus 140 is capable of displaying the first usage history using the third usage history received from the anomaly detection apparatus 240.

Although the anomaly detection system according to one or more aspects has been described above based on the embodiments, the present invention is not limited to these embodiments. Various modifications to these embodiments that can be conceived by those skilled in the art, and forms configured by combining structural elements in different embodiments without departing from the teachings of the present invention may be included in the scope of one or more of the aspects of the present invention.

For example, the anomaly detection system 30 according to Embodiment 3 may include one or both of the control unit 111 and the anomaly processing unit 211 which are included in the anomaly detection system 20 in Embodiment 2.

For example, the third usage history is used to detect an anomaly in the living pattern of the user in each of the above embodiments, but may be used in other applications. This means that the transmitting apparatus may transmit the third usage history to an apparatus different from the anomaly detection apparatus. For example, the transmitting apparatus may transmit the third usage history to a storage apparatus for storing the usage history. In this case, the transmitting apparatus may restore the first usage history as in Embodiment 3 by obtaining the third usage history stored in the storage apparatus, for example.

Furthermore, the first obtainment unit 101 obtains the usage history of the electrical device 300 directly from the electrical device 300 in each of the above embodiments, but may obtain the usage history of the electrical device 300 from a panel board connected to the electrical device 300 or a server in which the usage history of the electrical device 300 is accumulated. Furthermore, the first obtainment unit 101 may obtain usage histories of a plurality of electrical devices 300 as one usage history.

Furthermore, although the case where the first usage history includes the usage value for each of the cyclic time sections has been described in each of the above embodiments, the first usage history does not need to include the usage value for each of the cyclic time sections. For example, the first usage history may include a function of the electrical device 300 and a usage time point of the function. Specifically, the first usage history may include a combination of a time point at which a television is watched with a watched channel, for example. In this case, the second usage history includes a function of the electrical device 300 and a fixed dummy usage time point of the function.

Furthermore, the anomaly detection system includes the dummy history storage unit, the history pattern storage unit, the cycle information storage unit, or the like in each of the above embodiments, but does not need to include such a storage unit. In this case, each of the storage units may be included in an external storage apparatus connected to the transmitting apparatus or the anomaly detection apparatus, for example.

Furthermore, the second usage history (the dummy usage history) includes a fixed dummy value for each of the cyclic time sections in each of the above embodiments, but may include a fixed dummy value regardless of the time section. In other words, the second usage history may include one dummy value for a plurality of time sections. This allows a reduction in the storage area for storing the dummy value.

It is to be noted that in each of the above embodiments, each structural element may be constituted by dedicated hardware or achieved by executing a software program suited to the structural element. Each structural element may be achieved by a program execution unit such as a CPU or a processor reading and executing a software program recorded on a recording medium such as a hard disk or a semiconductor memory. Here, the software which achieves the transmitting apparatus in each of the above embodiments is the following program.

Specifically, this program causes a computer to execute a data processing method for processing usage history data of at least one electrical device used by a user, which includes: obtaining first usage history data indicating a usage history of the at least one electrical device used by the user; obtaining second usage history data indicating a fixed dummy usage history; generating third usage history data by combining the first usage history data and the second usage history data; and transmitting the third usage history data from a first apparatus to a second apparatus.

INDUSTRIAL APPLICABILITY

The present invention is usable in an anomaly detection system which detects an anomaly in a living pattern of a user from a usage history of an electrical device, and can be applied, for example, to a home security service and so on.

REFERENCE SIGNS LIST 10, 20, 30, 40 Anomaly detection system
100, 110, 120, 130, 140 Transmitting apparatus
101 First obtainment unit
102, 122, Second obtainment unit
103, 123 Dummy history storage unit
104 Combining unit
105, 124 Transmitting unit
111 Control unit 121 Setting unit
141 History display unit
200, 210, 220, 240 Anomaly detection apparatus
201, 221 Receiving unit
202, 222 Detection unit
203, 223 History pattern storage unit
211 Anomaly processing unit
224 Management unit
225 Cycle information storage unit
241 History storage unit
242 History management unit
300 Electrical device

The invention claimed is:

1. A data processing method for processing usage history data of at least one electrical device used by a user, the data processing method comprising:
    obtaining first usage history data indicating a usage history of the at least one electrical device used by the user;
    obtaining second usage history data indicating a fixed dummy usage history;
    generating third usage history data by combining the first usage history data and the second usage history data such that the first usage history data and the second usage history data cannot be individually identified from the third usage history data; and
    transmitting the third usage history data from a first apparatus to a second apparatus,
    wherein the first usage history data includes a usage value for each of cyclic time sections, the usage value indicating a usage level of the electrical device, and
    wherein the data processing method further comprises
        when the usage value included in the first usage history data is less than a threshold value, transmitting, to the electrical device, an instruction to charge a storage battery included in the electrical device is transmitted to the electrical device.

2. The data processing method according to claim 1,
    wherein the second usage history data includes a fixed dummy value for each of the cyclic time sections, and
    in the generating, the usage value and the dummy value are summed on a per time section basis to generate the third usage history data.

3. The data processing method according to claim 2,
    wherein the usage value indicates an amount of power consumed by the electrical device.

4. The data processing method according to claim 2,
    wherein the usage value indicates a total number of usages of a function of the electrical device.

5. The data processing method according to claim 2, further comprising:
    setting cycle information; and
    transmitting the set cycle information from the first apparatus to the second apparatus,
    wherein in the obtaining of second usage history data, the second usage history data that corresponds to the set cycle information is obtained from among a plurality of second usage history data.

6. The data processing method according to claim 5, further comprising
    displaying a first graphical user interface for specifying the cycle information,
    wherein in the setting, the cycle information specified by the user through the first graphical user interface is set.

7. The data processing method according to claim 6, further comprising
    displaying, before the cycle information is set, the first usage history data and the third usage history data that are to be obtained after the cycle information is set.

8. The data processing method according to claim 1,
    wherein the first usage history data includes a function of the electrical device and a usage time point of the function,
    the second usage history data includes a function of the electrical device and a fixed dummy usage time point of the function, and
    in the generating, the second usage history data is added to the first usage history data to generate the third usage history data.

9. The data processing method according to claim 1, further comprising
    detecting an anomaly in a living pattern of the user by the second apparatus comparing the third usage history data received from the first apparatus and a usage history pattern for detecting an anomaly.

10. The data processing method according to claim 9, further comprising
    performing, when the anomaly in the living pattern of the user is detected, processing appropriate for the anomaly detected.

11. The data processing method according to claim 10,
    wherein the processing appropriate for the anomaly is notifying a pre-registered terminal that the living pattern of the user contains the anomaly.

12. The data processing method according to claim 10,
    wherein the processing appropriate for the anomaly is switching a mode of a service provided to the user to an anomaly mode.

13. The data processing method according to claim 9,
    wherein the second usage history data includes a fixed dummy value for each of the cyclic time sections,
    the usage history pattern includes a reference value for each of the cyclic time sections,
    in the generating, the usage value and the dummy value are summed on a per time section basis to generate the third usage history data, and
    in the detecting, a summed value of the usage value and the dummy value included in the third usage history data and the reference value included in the usage history pattern are compared for each time section, to detect an anomaly in the living pattern of the user in the time section.

14. The data processing method according to claim 13, further comprising:
    setting cycle information; and
    transmitting the set cycle information from the first apparatus to the second apparatus,
    wherein in the obtaining of second usage history data, the second usage history data that corresponds to the set cycle information is obtained from among a plurality of second usage history data, and
    in the detecting, the anomaly in the living pattern of the user is detected using the usage history pattern that corresponds to a cycle indicated in the cycle information received from the first apparatus.

15. The data processing method according to claim 13, further comprising
    storing cycle information by the second apparatus into a storage unit, the cycle information being received from each of a plurality of the first apparatuses and stored in association with the first apparatus from which the cycle information originates, wherein in the detecting, the cycle information that corresponds to the first apparatus from which the third usage history data originates is obtained from the storage unit, and the anomaly in the living pattern of the user is detected using the usage history pattern that corresponds to a cycle indicated in the obtained cycle information.

16. The data processing method according to claim 9, further comprising:
storing, by the second apparatus, the third usage history data received from the first apparatus, into a storage unit;
transmitting, by the first apparatus, a request message for the third usage history data stored in the storage unit, to the second apparatus;
transmitting, by the second apparatus, the third usage history data stored in the storage unit, to the first apparatus, in compliance with the request message received from the first apparatus;
restoring, by the first apparatus, the first usage history data from the third usage history data received from the second apparatus, using the second usage history data; and
displaying, by the first apparatus, the restored first usage history data.

17. The data processing method according to claim 16, further comprising
displaying a second graphical user interface for specifying information related to the first usage history data that is to be restored,
wherein the request message includes information specified by the user through the second graphical user interface, and
in the transmitting of the third usage history data stored in the storage unit, the second apparatus transmits, to the first apparatus, the third usage history data that corresponds to the information included in the request message.

18. A transmitting apparatus which transmits usage history data of at least one electrical device used by a user, the transmitting apparatus comprising:
a processor; and
a non-transitory memory having stored thereon executable instructions, which when executed cause the processor to perform:
obtaining first usage history data indicating a usage history of the at least one electrical device used by the user;
obtaining second usage history data indicating a fixed dummy usage history;
generating third usage history data by combining the first usage history data and the second usage history data such that the first usage history data and the second usage history data cannot be individually identified from the third usage history data; and
transmitting the third usage history data,
wherein the first usage history data includes a usage value for each of cyclic time sections, the usage value indicating a usage level of the electrical device, and
wherein the processor further performs
when the usage value included in the first usage history data is less than a threshold value, transmitting, to the electrical device, an instruction to charge a storage battery included in the electrical device is transmitted to the electrical device.

19. The transmitting apparatus according to claim 18, which is configured as an integrated circuit.

20. An anomaly detection system comprising:
the transmitting apparatus according to claim 18; and
an anomaly detection apparatus for detecting an anomaly in a living pattern of the user,
wherein the anomaly detection apparatus detects the anomaly in the living pattern of the user by comparing the third usage history data received from the transmitting apparatus and a usage history pattern for detecting an anomaly.

21. The data processing method according to claim 1, wherein the second usage history is not dependent on the first usage history.

22. The transmitting apparatus according to claim 18, wherein the second usage history is not dependent on the first usage history.

* * * * *